(12) United States Patent
Takayama

(10) Patent No.: US 8,140,409 B2
(45) Date of Patent: Mar. 20, 2012

(54) TERMINAL DEVICE AND SECURITY DEVICE WHICH AUTOMATICALLY RECEIVE ELECTRONIC GIFT, INFORMATION PROVIDING METHOD FOR PROVIDING ELECTRONIC GIFT TOGETHER WITH REQUESTED ELECTRONIC INFORMATION, AND INFORMATION SERVER

(75) Inventor: Hisashi Takayama, Tokyo (JP)

(73) Assignee: Panasonic Corporation, Osaka (JP)

( * ) Notice: Subject to any disclaimer, the term of this patent is extended or adjusted under 35 U.S.C. 154(b) by 491 days.

(21) Appl. No.: 11/911,737

(22) PCT Filed: Apr. 19, 2006

(86) PCT No.: PCT/JP2006/308226
§ 371 (c)(1),
(2), (4) Date: Oct. 17, 2007

(87) PCT Pub. No.: WO2006/112481
PCT Pub. Date: Oct. 26, 2006

(65) Prior Publication Data
US 2009/0055284 A1 Feb. 26, 2009

(30) Foreign Application Priority Data
Apr. 19, 2005 (JP) .................... 2005-120682

(51) Int. Cl.
*G06Q 30/00* (2012.01)
(52) U.S. Cl. .................... 705/27.1; 705/26.1; 705/14.1; 705/14.23
(58) Field of Classification Search .................... 705/26, 705/27, 14
See application file for complete search history.

(56) References Cited

U.S. PATENT DOCUMENTS

2001/0049636 A1* 12/2001 Hudda et al. .................... 705/26
2004/0193484 A1* 9/2004 Allen .............................. 705/14
(Continued)

FOREIGN PATENT DOCUMENTS
JP 2001-250050 9/2001
(Continued)

OTHER PUBLICATIONS
International Search Report dated Aug. 1, 2006.
(Continued)

*Primary Examiner* — Jeffrey A Smith
*Assistant Examiner* — Courtney Stopp
(74) *Attorney, Agent, or Firm* — Pearne & Gordon LLP

(57) ABSTRACT

It is possible to provide a privilege for data communication without requiring a troublesome user operation and to realize an information provision system for ensuring anonymousness of the user for a site.
A terminal device 10 includes secure communication means 11 which establishes a safety communication session and performs data communication with an information server, electronic gift rule management means 12 which holds an electronic gift rule for defining an electronic gift condition, and data processing means 13 which processes data transmitted/received to/from the information server based on the electronic gift rule under the safety communication session and generates an electronic gift. The electronic gift generated by the data processing means is reflected on the electronic value. By setting the electronic gift rule in which the electronic value increases by the electronic gift, the data communication with the information server is performed while a user does not perform a troublesome operation and the electronic value can be automatically acquired. At this time, the user need not inform the information server of personal information.

14 Claims, 27 Drawing Sheets

U.S. PATENT DOCUMENTS

2004/0249758 A1  12/2004  Sukeda et al.
2005/0071251 A1* 3/2005  Linden et al. .................. 705/26

FOREIGN PATENT DOCUMENTS

| | | |
|---|---|---|
| JP | 2003-006407 | 1/2003 |
| JP | 2003-058764 | 2/2003 |
| JP | 2004-038812 | 2/2004 |
| JP | 2004-046503 | 2/2004 |
| JP | 2004-362084 | 12/2004 |
| JP | 2005-056203 | 3/2005 |

OTHER PUBLICATIONS http://www.ntt.com/packetfree/system.html "OCN Packet Free Service".

* cited by examiner

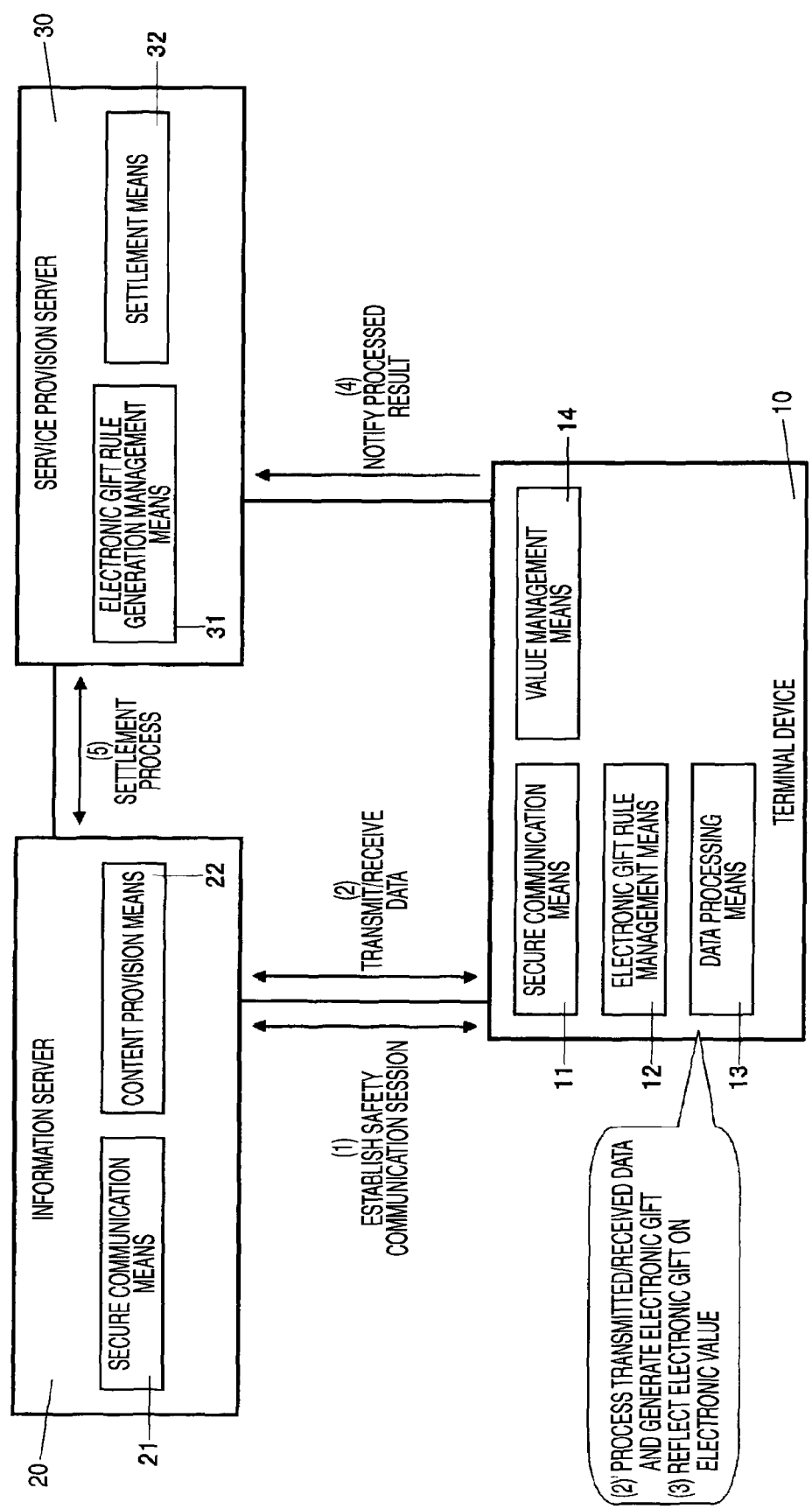

FIG. 2 (a)

| Field | |
|---|---|
| ELECTRONIC GIFT RULE IDENTIFICATION INFORMATION | 201 |
| INFORMATION SERVER DOMAIN | 202 |
| ELECTRONIC GIFT CALCULATION METHOD | 203 |
| ELECTRONIC GIFT REFLECTION CONDITION | 204 |
| ELECTRONIC VALUE IDENTIFICATION INFORMATION | 205 |
| ELECTRONIC GIFT PROVIDER IDENTIFICATION INFORMATION | 206 |
| SERVICE PROVISION SERVER IDENTIFICATION INFORMATION | 207 |
| AVAILABLE PERIOD | 208 |

FIG. 2 (b)

| Field | |
|---|---|
| ELECTRONIC GIFT RULE IDENTIFICATION INFORMATION | 201 |
| TARGET DATA URI | 212 |
| ELECTRONIC GIFT CALCULATION METHOD | 203 |
| ELECTRONIC GIFT REFLECTION CONDITION | 204 |
| ELECTRONIC VALUE IDENTIFICATION INFORMATION | 205 |
| ELECTRONIC GIFT PROVIDER IDENTIFICATION INFORMATION | 206 |
| SERVICE PROVISION SERVER IDENTIFICATION INFORMATION | 207 |
| AVAILABLE PERIOD | 208 |

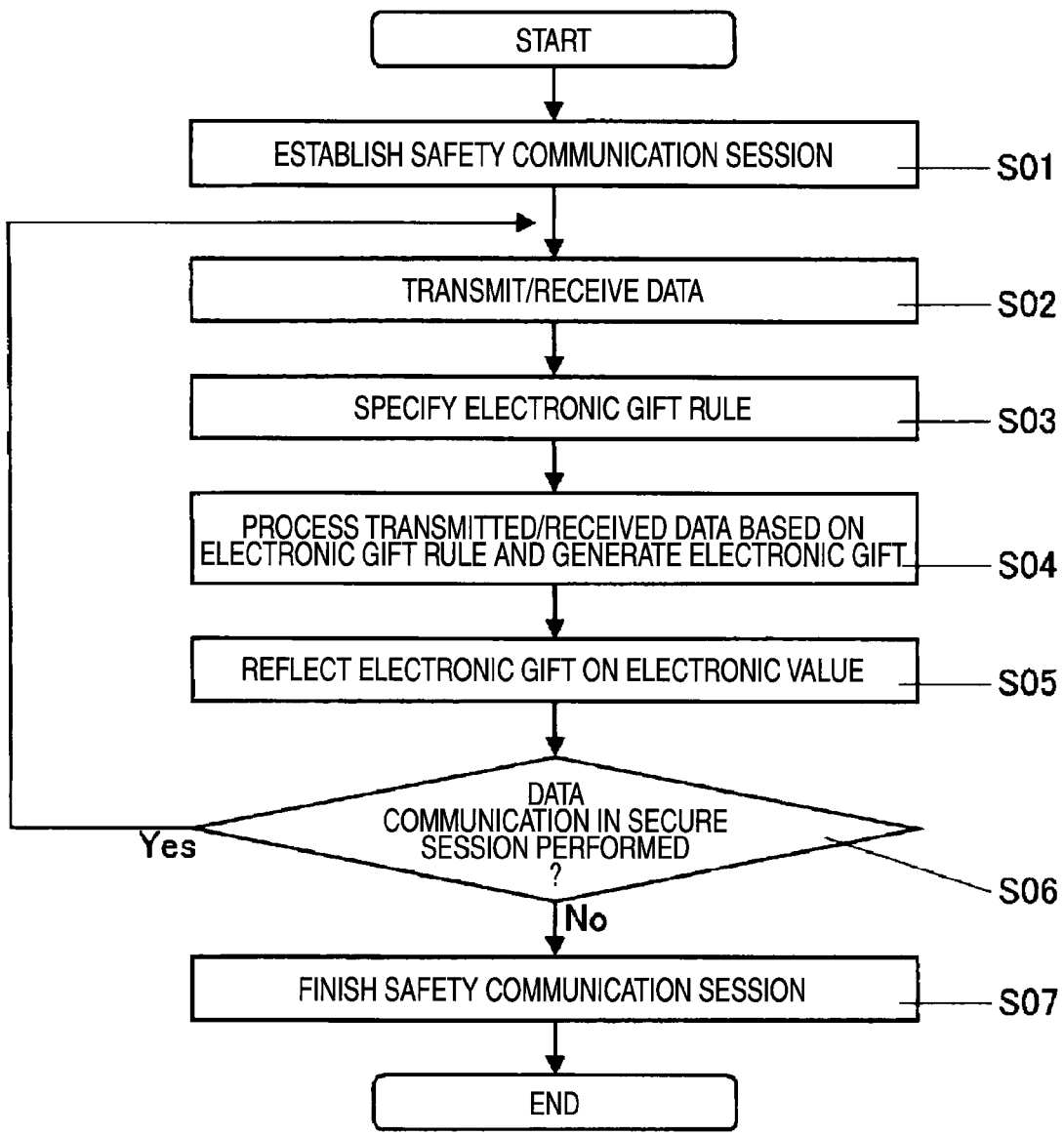

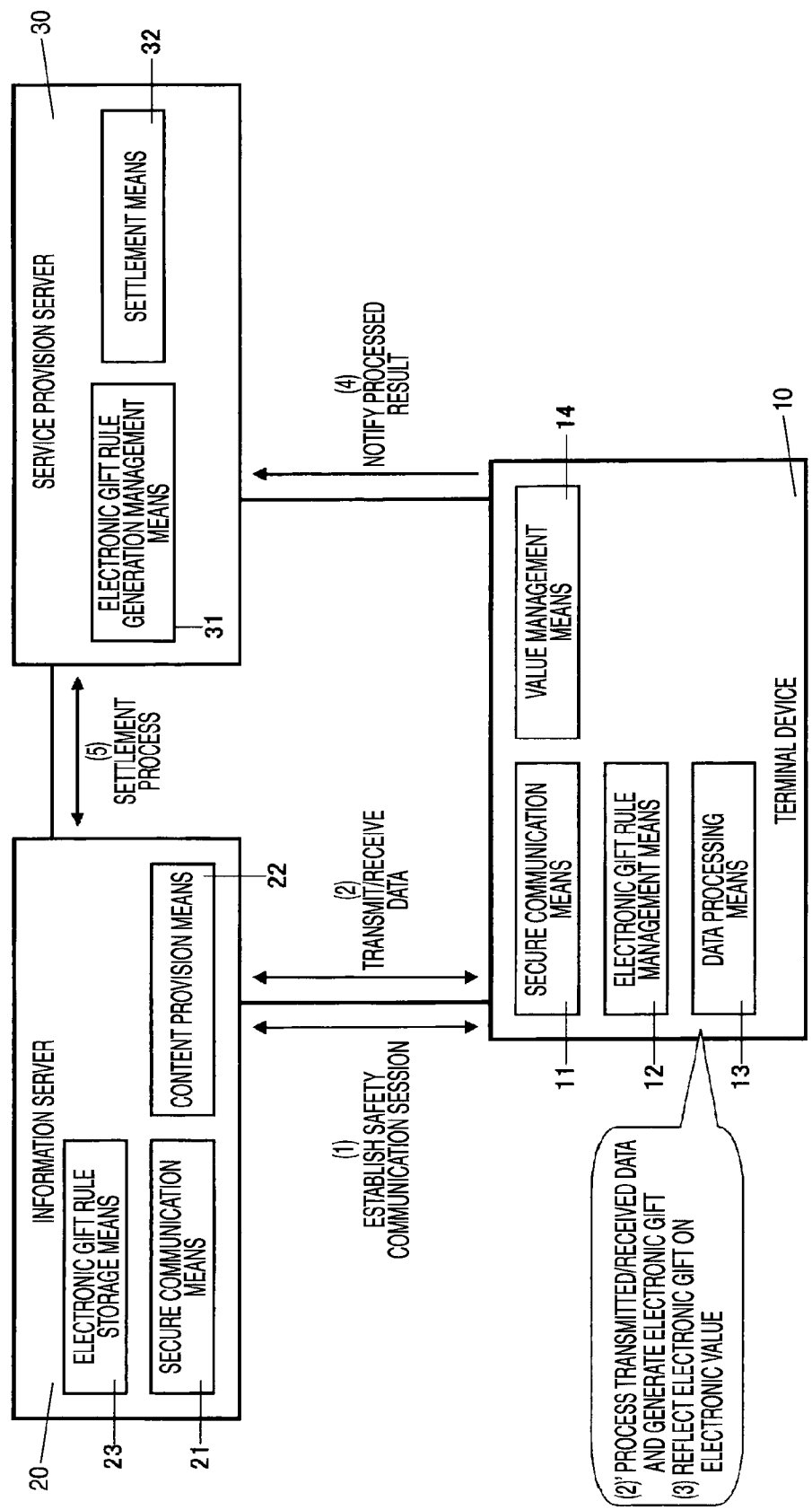

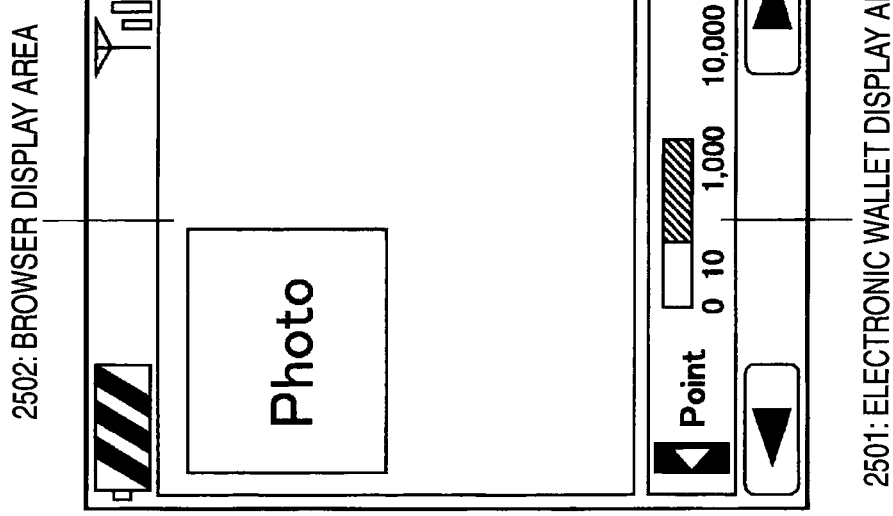
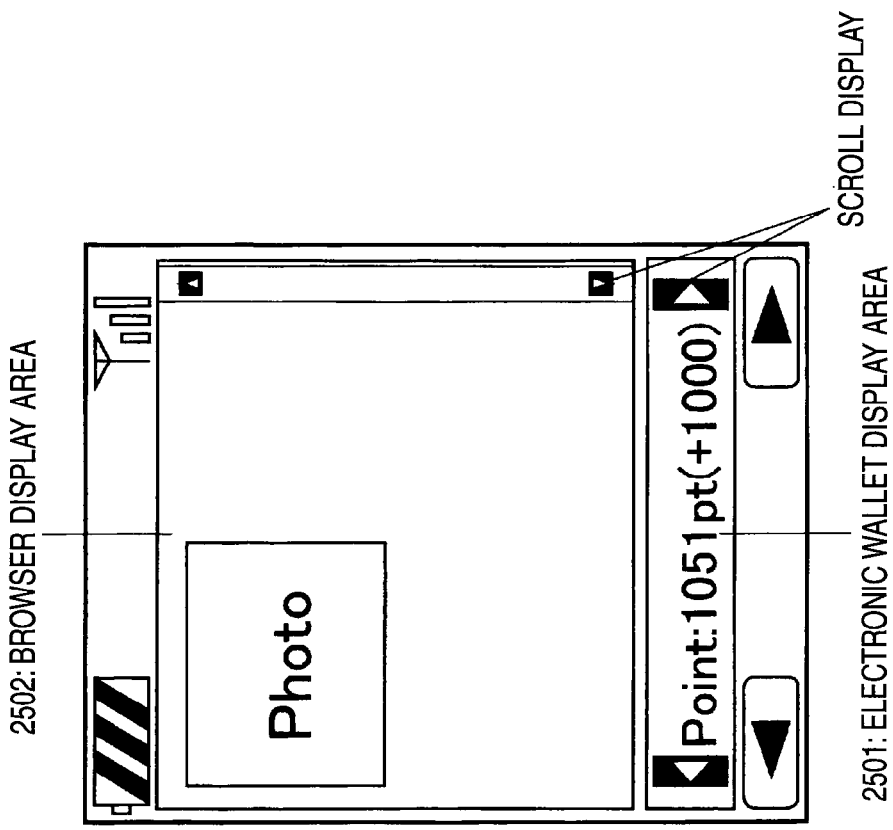
FIG. 25(a) / FIG. 25(b)

TERMINAL DEVICE AND SECURITY DEVICE WHICH AUTOMATICALLY RECEIVE ELECTRONIC GIFT, INFORMATION PROVIDING METHOD FOR PROVIDING ELECTRONIC GIFT TOGETHER WITH REQUESTED ELECTRONIC INFORMATION, AND INFORMATION SERVER

TECHNICAL FIELD

The present invention relates to a terminal device such as a mobile device, a security device including an IC card function mounted in the terminal device, an information server for providing information with respect to request from the terminal device, and an information providing method thereof, and more particularly, to prompting use of data communication by giving a privilege to acquisition of information in data communication of a terminal device.

BACKGROUND ART

Recently, for example, as described in Non-Patent Document 1, a system for imposing a packet communication fee on an information providing side when a user has access to a site with a mobile telephone is established. As shown in FIG. 26, this system includes a general gateway 2603 for imposing a packet communication fee on a user when a mobile telephone 2620 acquires information of general sites 2606 and 2607 via a mobile network 2610 and a free gateway 2602 for imposing a packet communication fee on an affiliation site which is an information provider when the mobile telephone 2620 has access to a site and acquires information. In this system, when the mobile telephone 2620 has access to the affiliation site 2605, an operation for switching an access gateway of the mobile telephone 2620 to the free gateway 2602 is performed by the user and, when the mobile telephone 2620 has access to the general sites 2606 and 2607, an operation for switching the access gate of the mobile telephone 2620 to the general gateway 2603 is performed.

In Patent Document 1, when a user is previously registered to a bank server on a network and has access to a web server to execute contribution, a system for giving a point in return is suggested. In this system, as shown in FIG. 27, first, a user has access to a bank server 2702 using a user terminal 2700 via a web server 2701 and registers a mail address and a password (1) (user registration). Next, the user inputs user authentication information such as a password using the user terminal 2700 and logs in the bank server 2702 via the web server 2701 (2) (user authentication), and executes a data communication such as contribution to a bulletin board (3) (data communication). The bank server 2702 gives the return for the contribution to the user, and accumulates and stores the point in a point file 2703 related to the mail address of the user (point return).

Patent Document 1: Japanese Unexamined Patent Application Publication No. 2004-38812

Non-Patent Document 1: http://www.ntt.com/packetfree/system.html "OCN packet free service"

DISCLOSURE OF THE INVENTION

Problem that the Invention is to Solve

However, in the system including the free gateway described in Non-Patent Document 1, the user must perform the troublesome operation for switching the access gateway of the mobile telephone. In the system for previously registering the user described in Patent Document 1, the point cannot be returned unless the personal information of the user such as the mail address or the password is disclosed.

The present invention is to solve such problems and it is an object of the present invention to provide an information server, a terminal device, and a security device, which realizes an information providing scheme for ensuring anonymousness of a user without requiring a troublesome user operation in an information providing service for automatically providing privilege to the user with respect to data communication.

Means for Solving the Problem

According to the present invention, there is provided a terminal device including secure communication means which establishes a safety communication session and performs data communication with an information server; electronic gift rule management means which holds an electronic gift rule for defining an electronic gift condition; data processing means which processes data transmitted/received to/from the information server based on the electronic gift rule under the safety communication session and generates an electronic gift; and value management means which manages an electronic value, wherein the electronic gift generated by the data processing means is reflected on the electronic value managed by the value management means.

As the benefit of the data communication with the information server, the electronic gift rule for increasing the amount of the electronic value by the reflection of the electronic gift is set. Accordingly, the terminal device performs the data communication with a specific information server while a user does not perform a troublesome operation and thus the user can automatically increase the amount of the electronic value. At this time, the user need not inform the information server of the personal information and thus anonymousness of the user for the information server is ensured.

In the terminal device according to the present invention, history management means which holds history information of a process of reflecting the electronic gift on the electronic value is included, and the data processing means processes the data transmitted/received to/from the information server based on the electronic gift rule and the history information under the safety communication session and generates the electronic gift.

Since the generation of the electronic gift can be controlled by the contents of the history information, it is possible to provide a different electronic gift to each user based on the access history of the user for the information server without holding the personal information of the user in the information server.

In the terminal device according to the present invention, electronic gift management means which temporarily holds the electronic gift generated by the data processing means and timely reflects the electronic gift on the electronic value is included, and the electronic gift management means reflects the temporarily held electronic gift on the electronic value based on the electronic gift rule and the history information held in the history management means.

The date and time when the electronic gift is reflected on the electronic value is controlled or the reflection of the electronic gift on the electronic value can be controlled by the combination of the electronic gifts held in the electronic gift management means, and the electronic gift can be provided to the user based on various condition setting of the electronic gift rule.

In the terminal device according to the present invention, the electronic gift management means calculates and manages contents of a potential electronic value when the electronic gift is reflected, in a state where the electronic gift management means temporarily holds the electronic gift.

By displaying the contents of the potential electronic value, on which the electronic gift is reflected, to the user, it is possible to prompt the data communication with the information server of the user.

According to the present invention, there is provided a security device mounted in a terminal device having a communication function including secure communication means which establishes a safety communication session and performs data communication with an information server via the terminal device; electronic gift rule management means which holds an electronic gift rule for defining an electronic gift condition; data processing means which processes data transmitted/received to/from the information server based on the electronic gift rule under the safety communication session and generates an electronic gift; and value management means which manages an electronic value, wherein the electronic gift generated by the data processing means is reflected on the electronic value managed by the value management means.

As the benefit of the data communication with the information server, the electronic gift rule for increasing the amount of the electronic value by the reflection of the electronic gift is set. Accordingly, the terminal device performs the data communication with a specific information server while a user does not perform a troublesome operation and thus the user can automatically increase the amount of the electronic value. At this time, the user need not inform the information server of the personal information and thus anonymousness of the user for the information server is ensured.

In the security device according to the present invention, history management means which holds history information of a process of reflecting the electronic gift on the electronic value is included, and the data processing means processes the data transmitted/received to/from the information server based on the electronic gift rule and the history information under the safety communication session and generates the electronic gift.

Since the generation of the electronic gift can be controlled by the contents of the history information, it is possible to provide a different electronic gift to each user based on the access history of the user for the information server without holding the personal information of the user in the information server.

In the security device according to the present invention, electronic gift management means which temporarily holds the electronic gift generated by the data processing means and timely reflects the electronic gift on the electronic value is included, and the electronic gift management means reflects the temporarily held electronic gift on the electronic value based on the electronic gift rule and the history information held in the history management means.

The date and time when the electronic gift is reflected on the electronic value is controlled or the reflection of the electronic gift on the electronic value can be controlled by the combination of the electronic gifts held in the electronic gift management means, and the electronic gift can be provided to the user based on various condition setting of the electronic gift rule.

In the security device according to the present invention, the electronic gift management means calculates and manages contents of a potential electronic value when the electronic gift is reflected, in a state where the electronic gift management means temporarily holds the electronic gift.

By displaying the contents of the potential electronic value, on which the electronic gift is reflected, to the user, it is possible to prompt the data communication with the information server of the user.

According to the present invention, there is provided an information providing method, wherein a terminal device comprises secure communication means which establishes a safety communication session and performs data communication with an information server; electronic gift rule management means which holds an electronic gift rule for defining an electronic gift condition; data processing means which processes data transmitted/received to/from the information server based on the electronic gift rule under the safety communication session and generates an electronic gift; and value management means which manages an electronic value, and wherein the terminal device establishes the safety communication session with the information server and transmits/receives data, and, at this time, the data processing means processes the data transmitted/received to/from the information server based on the electronic gift rule and reflects the electronic gift on the electronic value managed by the value management means.

As the benefit of the data communication with the information server, the electronic gift rule for increasing the amount of the electronic value by the reflection of the electronic gift is set. Accordingly, the terminal device performs the data communication with a specific information server while a user does not perform a troublesome operation and thus the user can automatically increase the amount of the electronic value. At this time, the user need not inform the information server of the personal information and thus anonymousness of the user for the information server is ensured.

According to the present invention, there is provided an information server including electronic gift rule generation means which generates an electronic gift rule; and secure communication means which establishes a safety communication session and performs data communication with a terminal device, wherein, with respect to a data communication request from the terminal device, the secure communication means establishes the safety communication session with the terminal device to transmit/receive data and, at this time, transmits the electronic gift rule generated by the electronic gift rule generation means to the terminal device.

By setting the electronic gift rule in each transmitted/received data by the electronic gift rule generation means, the information server can provide the electronic gift to the user based on the various condition settings.

In the terminal device according to the present invention, information which defines a condition for applying the electronic gift according to capacity of the data transmitted/received to/from the information server is included in the electronic gift rule, the terminal device establishes the safety communication session with the information server to transmit/receive the data, and, at this time, the data processing means counts the capacity of the data transmitted/received to/from the information server based on the electronic gift rule to calculate the applied electronic gift and adds the electronic gift to the electronic value managed by the electronic value management means.

When the communication fee of the terminal device is a data-capacity meter-rate system, it is possible to substantially reduce the user cost consumed for the data communication with the information server.

In the terminal device according to the present invention, information which defines a condition for applying the electronic gift according to capacity of the data transmitted/received to/from the information server is included in the electronic gift rule, the terminal device establishes the safety communication session with the information server to transmit/receive the data, at this time, the data processing means counts the capacity of the data transmitted/received to/from the information server based on the electronic gift rule to calculate the applied electronic gift, and the electronic gift management means calculates the contents of the potential electronic value, displays the data transmitted/received to/from the information server, and displays the contents of the potential electronic value.

By displaying the state in which the amount of the electronic value increases to the user in connection with the data communication with the information server, the data communication with the information server of the user is prompted.

In the terminal device according to the present invention, information which defines a condition for applying the electronic gift based on a result of checking check data included in the electronic gift rule and the data transmitted/received to/from the information server is included in the electronic gift rule, and, at this time, the data processing means checks the data transmitted/received to/from the information server and the check data based on the electronic gift rule to calculate the applied electronic gift and adds the electronic gift to the electronic value managed by the electronic value management means.

Since the check data included in the electronic gift rule functions as a lot and thus pleasure of the lot as well as the data communication with the information server is provided, the data communication with the information server of the user is prompted.

In the terminal device according to the present invention, information which defines a condition for applying the electronic gift based on a result of checking check data included in the electronic gift rule and the data transmitted/received to/from the information server is included in the electronic gift rule, at this time, the data processing means checks the data transmitted/received to/from the information server and the check data based on the electronic gift rule to calculate the applied electronic gift, and the electronic gift management means calculates the contents of the potential electronic value, displays the data transmitted/received to/from the information server, and displays the contents of the potential electronic value.

By displaying the state in which the amount of the electronic value increases to the user in connection with the data communication with the information server, the data communication with the information server of the user is prompted.

ADVANTAGE OF THE INVENTION

Since a terminal device and a security device according to the present invention automatically generates and reflects an electronic gift on an electronic value, it is possible to provide a privilege to a user only by performing data communication with an information server while the user does not perform a troublesome operation. The user need not inform the information server of personal information and thus anonymousness of the user for the information server can be ensured.

Since an information providing method and an information server according to the present invention can provide information to the terminal device and the security device and provide a privilege to the user, the use of the information server is prompted.

BRIEF DESCRIPTION OF THE DRAWINGS

FIG. 1 is a view showing a block configuration and the operation sequence of an information provision system according to a first embodiment of the present invention.

FIG. 2(a) is a view showing a data configuration of an electronic gift rule when a domain of an information server is specified, according to the first embodiment of the present invention, and FIG. 2(b) is a view showing a data configuration of an electronic gift rule when a URI of target data is specified, according to the first embodiment of the present invention.

FIG. 3 is a flowchart showing a process of generating an electronic gift and reflecting the electronic gift on an electronic value, according to the first embodiment of the present invention.

FIG. 4 is a view showing a block configuration of an information provision system when an electronic gift rule is received from an information server, according to the first embodiment of the present invention.

FIG. 25(*a*) is a view showing an example of a screen displayed on the terminal device according to the second embodiment of the present invention and FIG. 25(*b*) is a view showing an example of a screen displayed on the terminal device when contents of the electronic value is displayed as an image, according to the second embodiment of the present invention.

Figure 5:
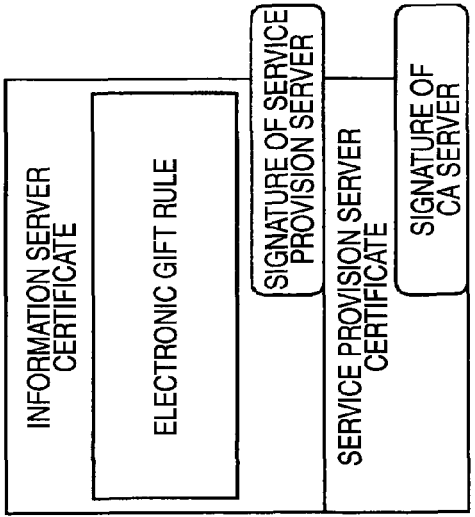
FIG. 5(a) is a view showing a data configuration of the electronic gift rule using an electronic signature according to the first embodiment of the present invention.
FIG. 5(b) is a view showing a data configuration of a server certificate including the electronic gift rule as expansion data according to the first embodiment of the present invention.
FIG. 5(c) is a view showing a data configuration of the electronic gift rule using an electronic signature of the information server 20 according to the first embodiment of the present invention.
Figure 5:
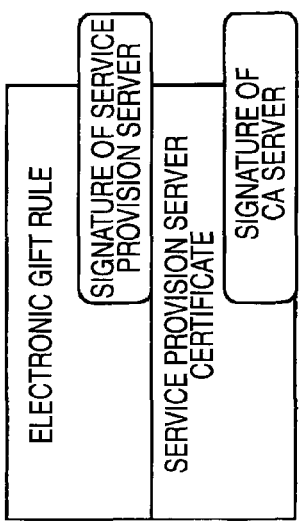
Figure 5:
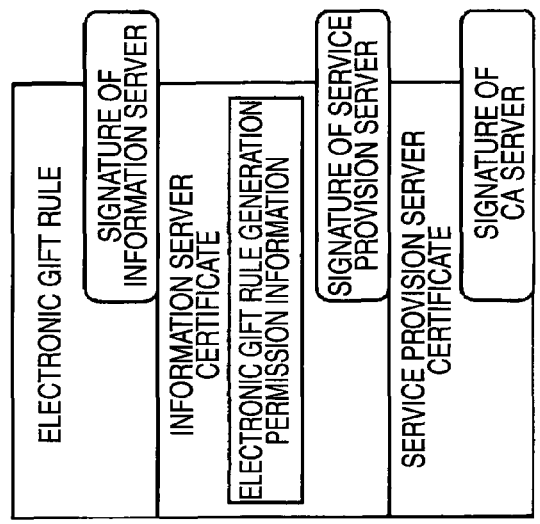

REFERENCE NUMERALS 10, 40: terminal device
11: secure communication means
12: electronic gift rule management means
13: data processing means
14: value management means
15: history management means
16: electronic gift management means
20: information server
21: secure communication means
22: content provision means
23: electronic gift rule storage means
24: electronic gift rule generation means
30: service provision server
31: electronic gift rule generation management means
32: settlement means
41: communication means
42: display means
50: security device
51: tamper-resistant data processing unit
52: flash memory
53: secure flash memory area
54: transmission/reception data buffer
55: electronic gift rule storage area
56: history information storage area
57: electronic gift storage area
60: electronic wallet card application
61: browser application
62: electronic wallet application
63: electronic money
64: royalty point
2602: free gateway
2603: general gateway
2605: affiliation site
2606: general site
2607: general site
2610: mobile network
2620: mobile telephone
2700: user terminal
2701: web server
2702: bank server
2703: point file

BEST MODE FOR CARRYING OUT THE INVENTION

In an information provision system according to an embodiment of the present invention, a terminal device performs data communication with a specific information server to give an electronic gift to a user of the terminal device. The terminal device has an electronic value such as electronic money or point. When the terminal device performs the data communication with the specific information server, the electronic gift is generated and reflected on the electronic value of the terminal device, thereby increasing the amount of the electronic value.

Imposition of a communication fee on the terminal device is performed by the existing system. In the present invention, the communication fee is substantially reduced by a separate system, without changing the existing system for imposing the communication fee.

First Embodiment

As shown in FIG. 1, the information provision system according to a first embodiment of the present invention includes a service provision server 30 of an electronic gift service provider who provides an electronic value service and an electronic gift service, an information server 20 of a site manager who affiliates with an electronic gift service business to provide information in the Internet, and a terminal device 10 such as a mobile telephone or a personal computer used by a user.

The information server 20 of the site manager includes secure communication means 21 which establishes a safety communication session and performs data communication with the terminal device 10 and content provision means 22 for providing multimedia data such as HTML data or moving-image data with respect to request from the terminal device 10.

The service provision server 30 of the electronic gift service provider includes electronic gift rule generation management means 31 for generating, holding and managing an electronic gift rule for defining an electronic gift condition and settlement means 32 for performing a settlement process with the information server 20 of the site manager based on history information received from the terminal device 10.

The terminal device 10 includes secure communication means 11 which establishes a safety communication session based on a secure session protocol such as a secure socket layer (SSL) and performs the data communication with the information server 20, electronic gift rule management means 12 for holding the electronic gift rule, data processing means 13 for processing data transmitted/received to/from the information server under the safety communication session based on the electronic gift rule and generating the electronic gift, and value management means 14 for managing an electronic value such as electronic money or a royalty point. In the electronic gift rule management means, the electronic gift rule which is previously set by the electronic gift service provider is held.

Actually, software modules including the respective functions of the secure communication means 11, the electronic gift rule management means 12, the data processing means 13 and the value management means 14 are stored in a storage means such as a ROM, an EEPROM or a hard disc of the terminal device 10 and executed by a CPU of the terminal device 10. Such software modules are protected by tamper resistance such that improper falsification is prevented.

The operation sequence of the image providing system is as follows.

(1) The secure communication means of the terminal device 10 and the secure communication means 21 of the information server 20 establish the safety communication session.

(2) Data is encrypted under the safety communication session established between the terminal device 10 and the information server 20 and transmitted/received.

(2)' At this time, the processing means processes the data transmitted/received to/from the information server based on the electronic gift rule held in the electronic gift rule management means and generates the electronic gift.

(3) The generated electronic gift is reflected on the electronic value managed by the value management means.

(4) The result of reflecting the electronic gift on the electronic value is notified to the service provision server 30.

(5) The settlement means 32 of the service provision server 30 verifies the result of reflecting the electronic gift on the electronic value received from the terminal device 10, tabulates the result in the information server, and performs a settlement process for the amount reflected on the electronic value with respect to the information server 20. Generally, the return for the value reflected on the electronic value by the settlement process is given to the electronic gift service provider of the service provision server 30.

In this system, since benefit is provided to the user by the process of reflecting the electronic gift on the electronic value on the terminal device 10 with respect to the data communication with the information server, anonymousness of the user for the information server is ensured. The reflected electronic value may be immediately used.

As shown in FIG. 2(*a*), the electronic gift rule includes electronic gift rule identification information 201 indicating identification information of an individual electronic gift rule, an information server domain 202 indicating a domain name of a uniform resource locator (URL) of the information server 20 which is a generation object of the electronic gift, an electronic gift calculation method 203 indicating a method for calculating the electronic gift, an electronic gift reflection condition 204 indicating a condition when reflecting the generated electronic gift on the electronic value, electronic value identification information 205 indicating identification information of the electronic value on which the electronic gift is reflected, electronic gift provider identification information 206 indicating identification information of an electronic gift provider, service provision server identification information 207 indicating identification information of the service provision server 30, and an available period 208 indicating an available period of the electronic gift rule, and is data which describes such information in an XML format. The electronic gift provider identification information 206 indicates the other side of the settlement process performed by the service provision server 30 and the identification information of the site manager of the information server is generally set.

The electronic gift is generated based on the electronic gift rule and reflected on the electronic value, the terminal device 10 notifies the settlement means 32 of the service provision server 30 indicated by the service provision server identification information 207 of the electronic gift rule of the result of reflecting the electronic gift on the electronic value. The reflecting result is notified after the terminal device 10 and the settlement means 32 perform mutual authentication. Even when a plurality of electronic gift service provides exist, the reflecting result is notified to the settlement means 32 of the service provision server of each of the electronic gift service providers.

The electronic gift rule applies to the data communication with the information server having the same domain name as that indicated by the information server domain 202. In the information server domain 202, a list having a plurality of domain names may be set. In this case, the electronic gift rule applies to the data communication with the server having the same domain name as that of the list.

FIG. 2(*b*) shows a data configuration of the electronic gift rule when the electronic gift rule applies to individual data, which is identical to that of the electronic gift rule shown in FIG. 2(*a*) except that target data URI 212 indicating a uniform resource identifier URI which is a generation target of the electronic gift is included instead of the information server domain 202. In the target data URI 212, a list having a plurality of URIs may be set. In this case, the electronic gift rule applies to a case where data having the same URI as that of the list is transmitted/received.

The terminal device 10 performs a process of generating the electronic gift and reflecting the electronic gift on the electronic value according to a process shown in FIG. 3.

First, the terminal device 10 establishes the safety communication session with the information server 20 using the secure communication means 11 (S01).

Next, the terminal device 10 transmits or receives data to or from the information server 20 (S02). When the data is transmitted, an electronic gift rule is specified in the electronic gift rules held in the electronic gift rule management means 12 based on the URL of a transmission destination and, when the data is received, the electronic gift rule is specified based on the URL of a transmission source (S03). At this time, the terminal device 10 specifies the electronic gift rule by checking the URL and the information server domain 202 of the electronic gift rule or the target data URI 212.

Next, the data processing means 13 of the terminal device 10 analyzes contents of the specified electronic gift rule, processes the transmitted/received data based on a method indicated by the electronic gift calculation method 203, generates the electronic gift (S04), and reflects the electronic gift generated based on the electronic gift reflection condition 204 of the electronic gift rule on the electronic value indicated by the electronic value identification information 205 (S05).

Next, the terminal device 10 determines whether the data communication is performed under the safety communication session (S06). When the data communication is performed, the process progresses to the step S02, which the data is transmitted or received, and, when the data communication is not performed, the safety communication session is finished (S07).

In the step S03, when the electronic gift rule corresponding to the URL of the transmitted/received data does not exist in the electronic gift rules held in the electronic gift rule management means 12 and the electronic gift rule cannot be specified, the terminal device 10 performs the step S06 without performing the step S04 and the step S05.

Although the electronic gift rule is previously held in the electronic gift rule management means 12, the electronic gift rule may be received from the information server 20 or the service provision server 30. In this case, the terminal device 10 receives the electronic gift rule using an electronic signature of the service provision server 30 from the information server 20 or the service provision server 30 and holds the electronic gift rule in the electronic gift rule management means 12 when the validity of the electronic signature is verified. In this case, the electronic gift rule which is previously set by the electronic gift service provider or the electronic gift rule which is received from the service provision server 30 and has the verified validity is held in the electronic gift rule management means 12.

FIG. 4 shows the configuration of an information provision system in this case, which is identical to that of the information provision system described with reference to FIG. 1 except that an electronic gift rule storage means 23 for storing the electronic gift rule transmitted to the terminal device 10 is added to the information server 20. In the electronic gift rule storage means 23, the electronic gift rule generated by the electronic gift rule generation management means 31 of the service provision server 30 based on contract between the electronic gift service provider and the site manager of the information server 20 is stored. The operation of the components of the information provision system shown in FIG. 4 is identical to that of the information provision system described with reference to FIG. 1 except that the electronic gift rule which is sent from the information server 20 or the service provision server 30 to the terminal device 10 and has the verified validity is held in the electronic gift rule management means 12.

FIG. 5(*a*) shows a data configuration of the electronic gift rule using the electronic signature in this case. In this case, with respect to the electronic gift rule having the data configuration described with reference to FIG. 2(*a*) or FIG. 2(*b*), the electronic signature of the service provision server is used and a service provision server certificate which is issued by a certificate authority (CA) server is attached.

In the verification of the validity of the electronic signature used in the electronic gift rule, which is executed by the terminal device 10, the terminal device 10 verifies the validity of the service provision server certificate using a public key of the CA server held in the terminal device 10 and verifies the electronic signature of the service provision server using a public key of the service provision server indicated by the service provision server certificate. In such verification, when the validity of the electronic gift rule is verified, the terminal device 10 holds the electronic gift rule in the electronic gift rule management means 12, and, when the validity of the electronic gift rule is not verified, the terminal device 10 does not hold the received electronic gift rule in the electronic gift rule management means 12 and deletes the data. Accordingly, the terminal device 10 prevents an improperly generated electronic gift rule from being held in the electronic gift rule management means 12.

The information provision system shown in FIG. 4 may receive the electronic gift rule as the server certificate of the information server 20. In this case, the terminal device 10 receives the server certificate including the electronic gift rule as expansion data of the certificate when the safety communication session is established with the information server 20 (S01).

FIG. 5(*b*) shows a data configuration of the server certificate including the electronic gift rule as the expansion data in this case. In this case, the electronic gift rule having the data configuration described with reference to FIG. 2(*a*) or FIG. 2(*b*) is set as a field of the expansion data of the certificate. With respect to the certificate, the electronic signature of the service provision server is used and the service provision server certificate which is issued by the CA server is attached.

The terminal device 10 receives the server certificate having the configuration shown in FIG. 5(*b*) from the information server 20 and verifies the validity thereof, in a process of establishing the safety communication session with the information server 20 of the step S01. In the verification of the validity of the server certificate, the terminal device 10 verifies the validity of the service provision server certificate using the public key of the CA server held in the terminal device 10 and then verifies the electronic signature of the service provision server used in the server certificate using the public key of the service provision server indicated by the service provision server certificate. In such verification, when the validity of the server certificate is not verified, the terminal device 10 stops the process of establishing the safety gift rule management means 12 with the information server 20 without holding the server certificate in the electronic gift rule management means 12 and stops the process of generating the electronic gift. When the validity of the server certificate is verified, the terminal device 10 holds the server certificate in the electronic gift rule management means 12 as the electronic gift rule and establishes the safety communication session with the information server 20. The terminal device specifies the electronic gift rule which is received as the server certificate and held in the electronic gift rule management means 12 as the electronic gift rule used in the process of generating the electronic gift only in a case where the safety communication session with the information server is established based on the server certificate (process of the step S03 of FIG. 3) and specifies the electronic gift rule as the electronic gift rule used in the process of generating the electronic gift in the other case.

Since the electronic gift rule held in the electronic gift rule management means 12 of the terminal device 10 may be added later after the safety of impropriety is ensured, even when a site management of any information server newly affiliates with the electronic gift service business, the terminal device 10 receives the electronic gift rule so as to provide the electronic gift service to the newly affiliated information server.

Although the electronic gift rule is generated in the electronic gift rule generation management means 31 of the service provision server 30 in the above description, the information server 20 may generate the electronic gift rule and transmit the electronic gift rule to the terminal device 10. In this case, the terminal device 10 receives the electronic gift rule using the electronic signature of the information server 20 from the information server 20 and holds the electronic gift rule in the electronic gift rule management means 12 when the validity of the electronic signature is verified.

Figure 6:
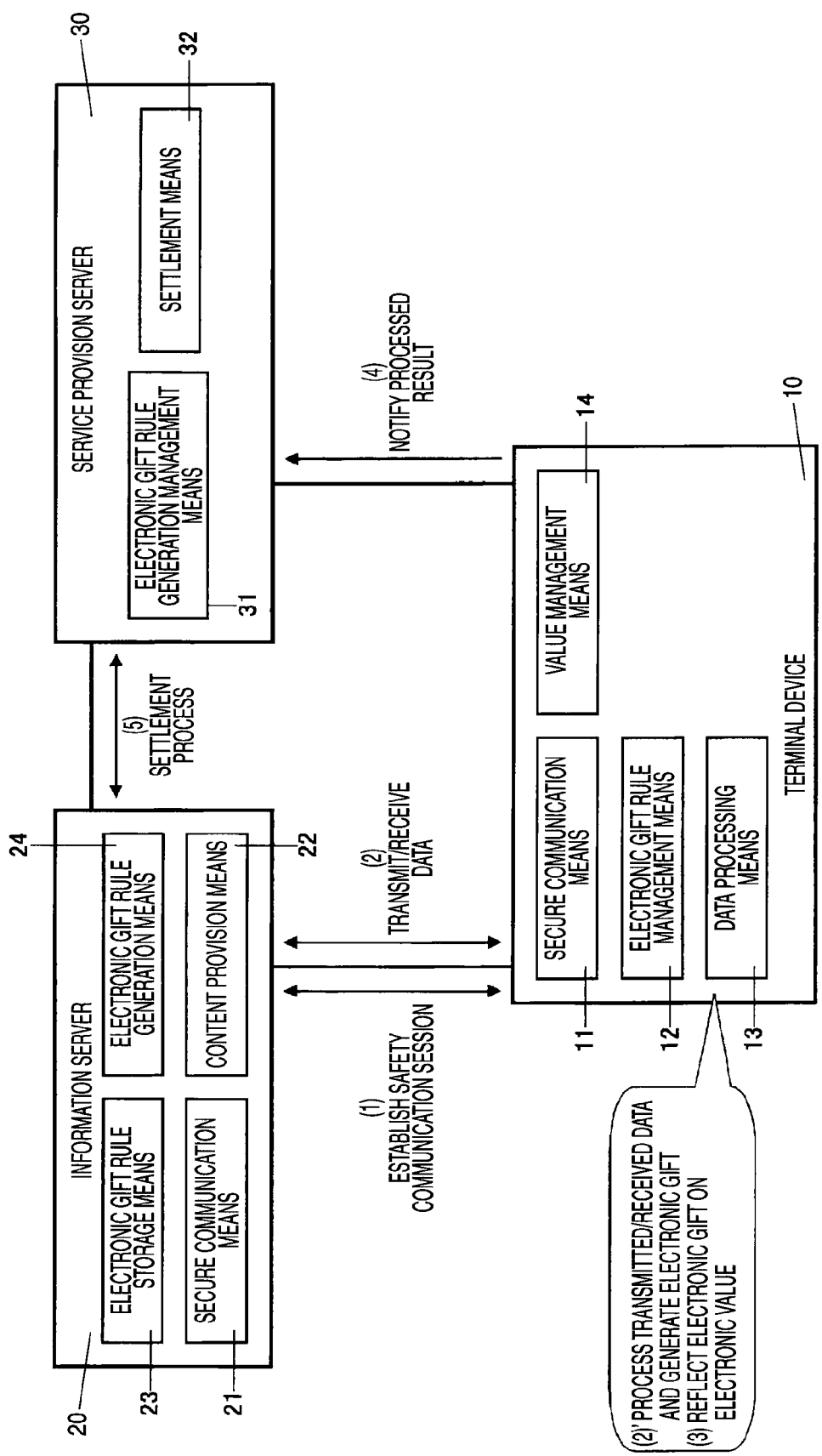
FIG. 6 is a view showing a block configuration of the information provision system when the information server generates the electronic gift rule according to the first embodiment of the present invention.

FIG. 6 shows the configuration of the information provision system in this case, which is identical to that of the information provision system described with reference to FIG. 4 except that electronic gift rule generation means 24 for generating the electronic gift rule transmitted to the terminal device 10 is added to the information server 20.

The electronic gift rule generation means 24 generates the electronic gift rule for setting a free condition in a contact range between the electronic gift service provider and the site manager of the information server 20 and stores the electronic gift rule in electronic gift rule storage means 23. The operation of the components of the information provision system shown in FIG. 6 is identical to that of the information provision system described with reference to FIG. 4 except that the terminal device 10 holds the electronic gift rule which is generated by the information server 20 and received from the information server 20 and has the verified validity.

FIG. 5(c) shows a data configuration of the electronic gift rule using the electronic signature of the information server 20 in this case. In this case, with respect to the electronic gift rule having the data configuration described with reference to FIG. 2(a) or FIG. 2(b), the electronic signature of the information server 20 is used and an information server certificate which is a certificate of the information server issued by the service provision server 30 and the service provision server certificate issued by the CA server are attached. In the information server certificate, electronic gift rule generation permission information indicating that the service provision server 30 permits the information server 20 to generate the electronic gift rule is included as the expansion data.

In the verification of the validity of the electronic signature used in the electronic gift rule, the terminal device 10 verifies the validity of the service provision server certificate using the public key of the CA server held in the terminal device 10, verifies the validity of the information server certificate including the electronic gift rule generation permission information as the expansion data of the certificate using the public key of the service provision server indicated by the service server certificate, and verifies the electronic signature of the information server 20 using the public key of the information server 20 indicated by the information server certificate. In such verification, when the validity of the electronic gift rule is verified, the terminal device 10 holds the electronic gift rule in the electronic gift rule management means 12 and, when the validity of the electronic gift rule is not verified, the terminal device 10 does not hold the received electronic gift rule in the electronic gift rule management means 12 and removes the data. Accordingly, the terminal device 10 prevents the improperly generated electronic gift rule from being held in the electronic gift rule management means 12.

The terminal device 10 generates the electronic gift based on the electronic gift rule generated by the information server 20 and reflects the electronic gift on the electronic value, and notifies the settlement means 32 of the service provision server 20 of the electronic gift rule. The result of the reflection process is notified after the mutual authentication between the terminal device 10 and the settlement means 32 and the settlement means 32 of the service provision server 30 verifies the result of the reflection process received from the terminal device 10 and the contents of the electronic gift rule, tabulates them in each information server, and performs the settlement process of the amount of the electronic gift reflected on the electronic value with the information server 20. At this time, the settlement means 32 of the service provision server 30 verifies the validity of the received electronic gift rule and verifies that the process of reflecting the electronic gift on the electronic value is correctly performed based on the electronic gift rule.

After the safety of impropriety is ensured, it is possible to provide the electronic gift service with respect to the electronic gift rule generated by the information server. Since the site manager of the information server can timely generate the electronic gift rule in which a free condition is set in a contract range between the electronic gift service provider and the site manager of the information server 20, without requesting the electronic gift service provider (service provision server 30) to generate the electronic gift rule even when the electronic gift based on a new condition is provided, the site manager of the information server can realize the electronic gift service having higher flexibility.

Although the CPU of the terminal device 10 executes the software modules corresponding to the respective functions of the communication means 11, the electronic gift rule management means 12, the data processing means 13 and the value management means 14 in the above description, the CPU of the security device including a tamper-resistant mechanism such as an IC card mounted in the terminal device may execute the software modules corresponding to the respective functions of the secure communication means 11, the electronic gift rule management means 12, the data processing means 13 and the value management means 14.

Figure 7:
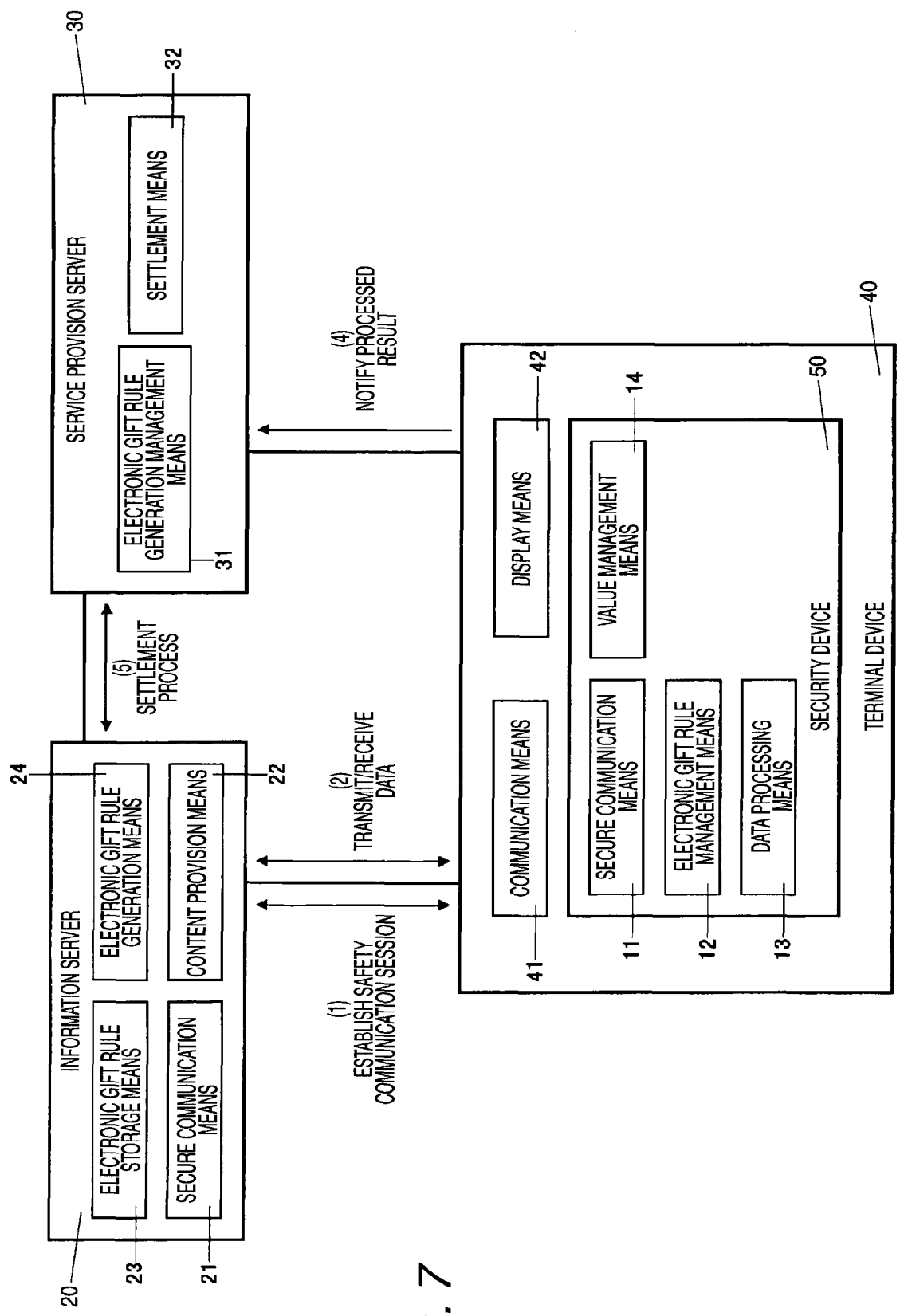
FIG. 7 is a view showing a block configuration of the information provision system when the terminal device includes a security device, according to the first embodiment of the present invention.

FIG. 7 shows the configuration of the terminal device and the configuration of the information provision system in this case. The terminal device 40 includes communication means 41 for performing data communication with the information server 20 and display means 42 for displaying the result of the data communication, and the security device 50 includes the secure communication means 11, electronic gift rule management means 12, the data processing means 13 and the value management means 14.

Actually, the software modules including the respective functions such as the secure communication means 11, electronic gift rule management means 12, the data processing means 13 and the value management means 14 are stored in storage means such as a ROM or an EEPROM of the security device 50 and executed by the CPU of the security device 50. The configuration of the information provision system is identical to that of the information provision system described with reference to FIG. 6 except the configuration of the terminal device 40.

The operation of the components of the information provision system shown in FIG. 7 is identical to that of the information provision system described with reference to FIG. 6 except that the secure communication means 11 of the security device 50 establishes the safety communication session with the information server via the communication means 41 and the security device 50 performs the process of generating the electronic gift and reflecting the electronic gift on the electronic value.

Figure 8:
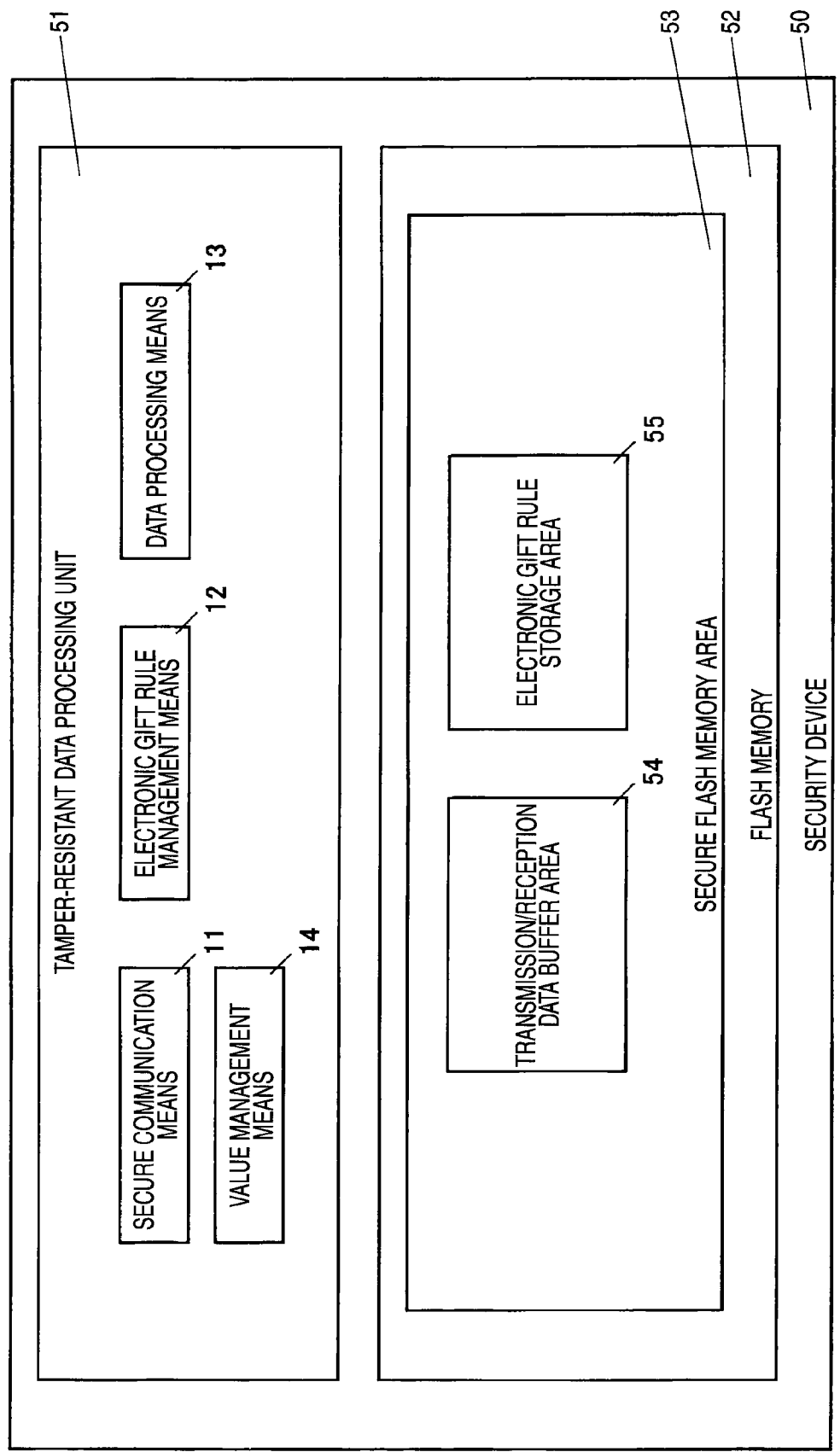
FIG. 8 is a view showing an example of a block configuration of the security device according to the first embodiment of the present invention.

FIG. 8 is an example of the configuration of the security device 50 in this case. In FIG. 8, the security device 50 is detachably mounted or fixedly embedded.

As the security device 50, a device described in Japanese Unexamined Patent Application Publication No. 2004-199138 is used. This security device 50 includes a tamper-resistant data processing unit 51 including a tamper-resistant area having excellent confidentiality and a flash memory 52 having a large storage capacity. The flash memory 52 has a secure flash memory area 53 having confidentiality similar to that of the tamper-resistant data processing unit 51. The security device 50 includes an interface with the terminal device 40, but is not shown in the drawing.

The tamper-resistant data processing unit 51 includes a memory for storing the software modules corresponding to the secure communication means 11, the electronic gift rule management means 12, the data processing means 13 and the value management means 14 and the CPU for executing the software modules.

The secure flash memory are 53 includes a transmission/reception data buffer area 54 for temporarily storing data transmitted/received to/from the secure communication means 11 via the communication means 41 and an electronic gift rule storage area 55 for storing the electronic gift rule managed by the electronic gift rule management means 12, in a state where the safety communication session with the information server 20 is established. In the transmission/reception data buffer area 54, the data before the data which is transmitted from the secure communication means 11 to the information server 20 via the communication means 41 is encrypted and the data after the data which is transmitted from the information server 20 to the secure communication means 11 via the communication means 41 is decrypted are stored. The data processing means 13 processes the transmitted/received data stored in the transmission/reception data buffer area 54 based on the electronic gift rule, generates the electronic gift and reflects the electronic gift on the electronic value. The data of the secure flash memory area 53 is managed to be accessed only by the tamper-resistant data processing unit 51 and thus, in the secure flash memory area 53, the confidentiality similar to that of the tamper-resistant data processing unit 52 is maintained.

Since the process of generating the electronic gift and reflecting the electronic gift on the electronic value is performed in the security device 50 having higher tamper resistance, the safety of the electronic gift service is improved.

Second Embodiment

An information provision system according to a second embodiment of the present invention can provide different electronic gifts to users while ensuring the anonymousness of the user for the information server.

Figure 9:
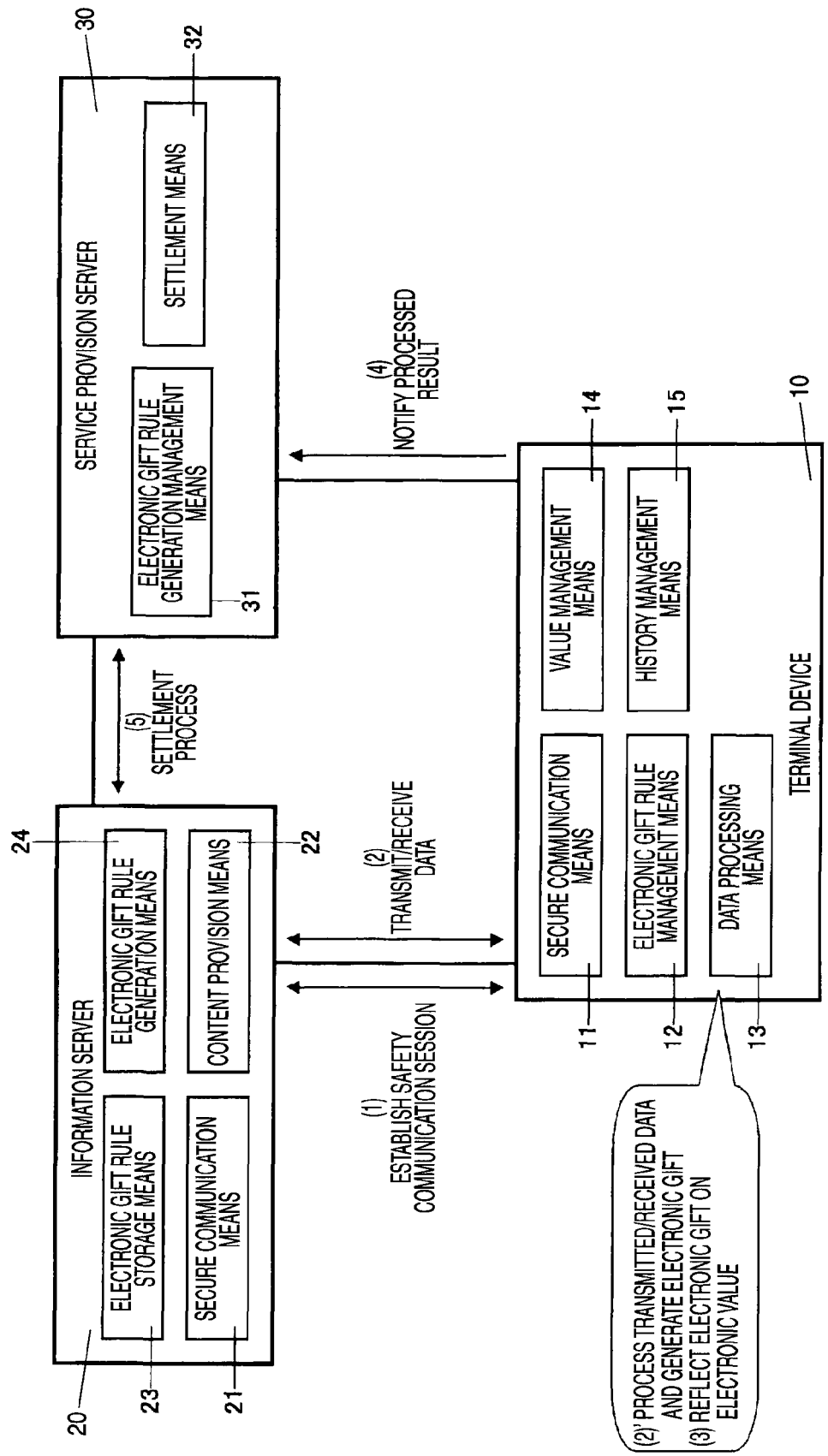
FIG. 9 is a view showing a block configuration and the operation sequence of an information provision system according to a second embodiment of the present invention.

FIG. 9 shows the configuration of the information provision system according to the present embodiment, which is identical to that of the information provision system according to the first embodiment described with reference to FIG. 6 except that history management means 15 for holding history information of the process of the electronic gift reflected on the electronic value is added to the terminal device 10. The information server 20 need not hold personal information of the user and access log information.

Actually, the software modules including the respective functions of the secure communication means 11, the electronic gift rule management means 12, the data processing means 13, the value management means 14 and the history management means 15 are stored in a storage means such as a ROM, an EEPROM or a hard disc of the terminal device 10 and executed by the CPU of the terminal device 10. Such software modules are protected by tamper resistance such that improper falsification is prevented.

The terminal device 10 according to the present embodiment generates the electronic gift by allowing the data processing means 13 to process the data transmitted/received to/from the information server 20 based on the electronic gift rule and the history information held in the history management means 15 under the safety communication session.

The operation of the components of the information provision system shown in FIG. 9 is identical to that of the information provision system described with reference to FIG. 6 except that the terminal device 10 generates the electronic gift based on the history information and the electronic gift rule.

Figure 10:
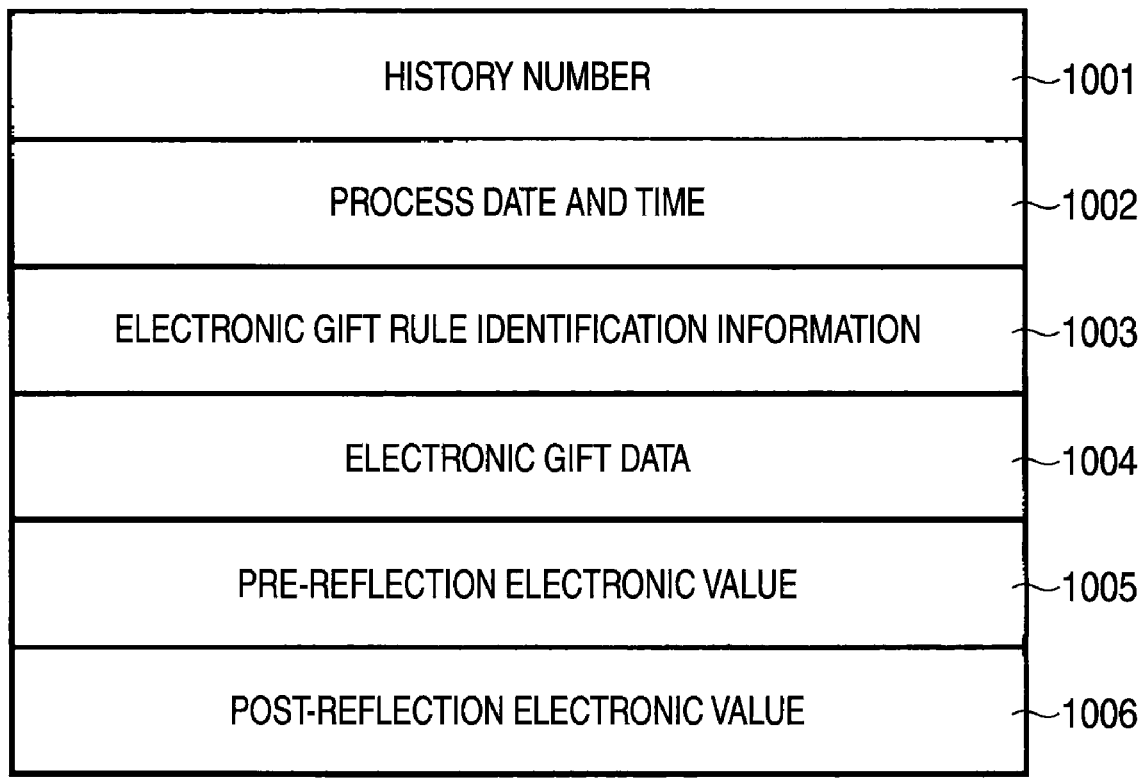
FIG. 10 is a view showing a data configuration of history information according to the second embodiment of the present invention.

In the history management means 15, the history information having a data configuration shown in FIG. 10 is held with respect to one process of reflecting the electronic gift on the electronic value. The history information includes a history number 1001 for identifying individual history information, a process date and time for performing the process of reflecting the electronic gift on the electronic value, electronic gift rule identification information 1003 (identical to the electronic gift rule identification information 201) indicating the identification information of the electronic gift rule, electronic gift data 1004 which is object data of the electronic gift reflected on the electronic value, a pre-reflection electronic value 1005 indicating the electronic value before the electronic gift is reflected, and a post-reflection electronic value 1006 after the electronic value after the electronic gift is reflected.

In the present embodiment, an electronic gift calculation method using the contents of the history information held in the history management means 15 as one element for calculating the electronic gift is set to the electronic gift calculation method 203 of the electronic gift rule. For example, the electronic gift calculation method having the contents "the electronic gift rule identification information of the electronic gift rule used in the generation of the electronic gift and the electronic gift rule identification information of the history information held in the history management means 15 are compared, the electronic gift for adding 200 points to the electronic value (royalty point) is generated when there is no history information having the identical electronic gift rule identification information, and the electronic gift is not generated when there is history information having the identical electronic gift rule identification information" is set. In this case, only when the electronic gift based on the electronic gift rule is first reflected on the electronic value (royalty point), 200 points are added and then the electronic gift is not generated.

The electronic gift calculation method having the contents "the electronic gift rule identification information of the electronic gift rule used in the generation of the electronic gift and the electronic gift rule identification information of the history information held in the history management means 15 are compared, the electronic gift for adding 100 points to the electronic value (royalty point) is generated when there is no history information having the identical electronic gift rule identification information, and the electronic gift for adding 1 point to the electronic value (royalty point) is generated when there is history information having the identical electronic gift rule identification information" may be set. In this case, only when the electronic gift based on the electronic gift rule is first reflected on the electronic value (royalty point), 100 points are added and then only 1 point is added to the electronic value (royalty point).

Figure 11:
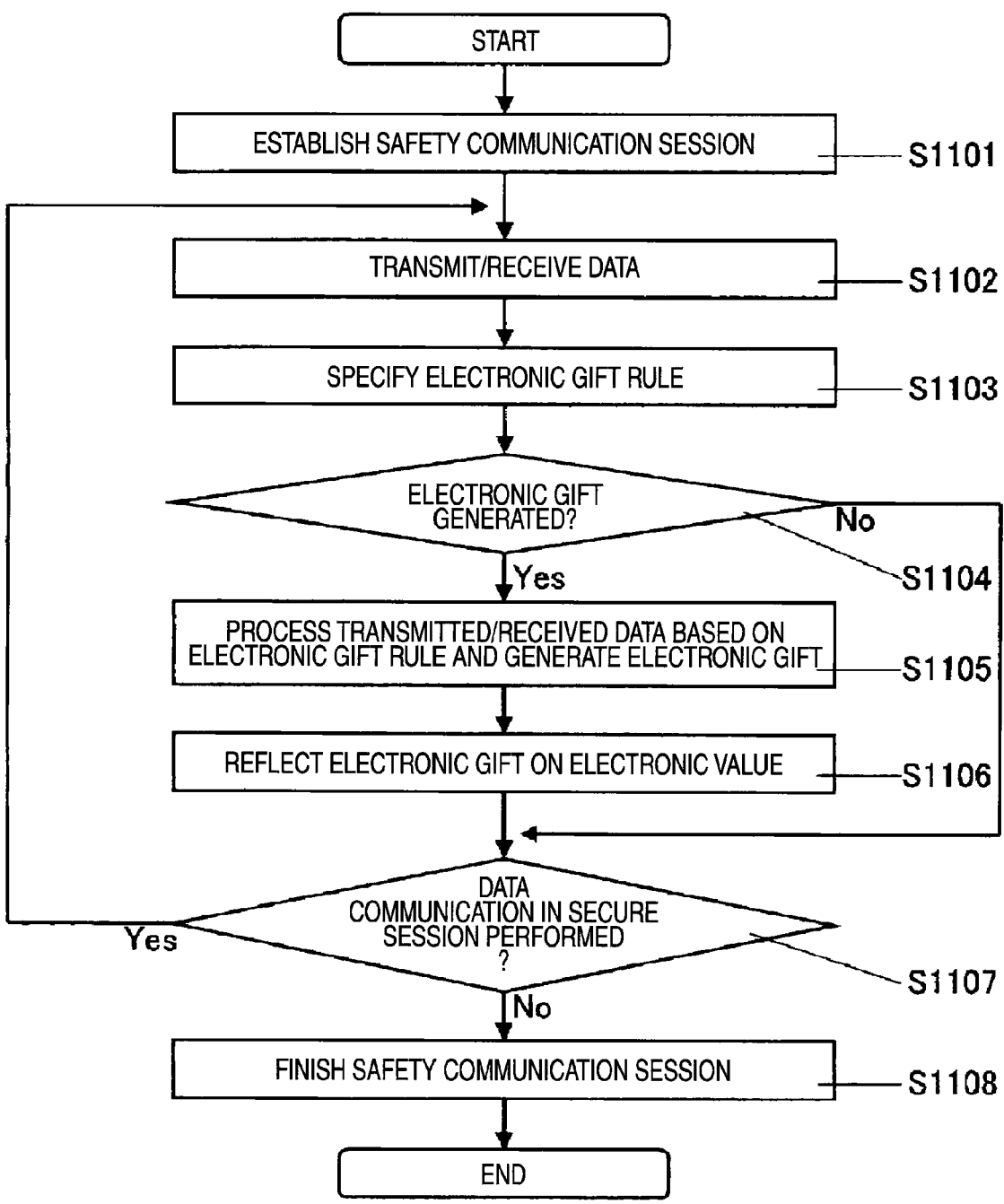
FIG. 11 is a flowchart showing a process of generating an electronic gift of a terminal device and reflecting the electronic gift on an electronic value according to the second embodiment.

The terminal device 10 according to the present embodiment performs a process of generating the electronic gift and reflecting the electronic gift on the electronic value according to a process shown in FIG. 11.

First, the terminal device 10 establishes the safety communication session with the information server 20 using the secure communication means 11 (S1101).

Next, the terminal device 10 transmits or receives data to or from the information server 20 (S1102). When the data is transmitted, an electronic gift rule is specified in the electronic gift rules held in the electronic gift rule management means 12 based on the URL of a transmission destination and, when the data is received, the electronic gift rule is specified based on the URL of a transmission source (S1103). At this time, the terminal device 10 specifies the electronic gift rule by checking the URL and the information server domain 202 of the electronic gift rule or the target data URI 212.

Next, the data processing means 13 of the terminal device 10 analyzes contents of the specified electronic gift rule and determines whether the electronic gift can be generated based on the history information held in the history management means 15 and the analyzed electronic gift rule (S1104). When it is determined that the electronic gift can be generated, the data processing means 13 processes the transmitted/received data based on a method indicated by the electronic gift calculation method 203 of the electronic gift rule and the history information held in the history management means 15, generates the electronic gift (S1105), and reflects the electronic gift generated based on the electronic gift reflection condition 204 of the electronic gift rule on the electronic value indicated by the electronic value identification information 205 (S1106). At this time, the history information on the process of reflecting the electronic gift on the electronic value is also held in the history management means 15.

Next, the terminal device 10 determines whether the data communication is performed under the safety communication session (S1107). When the data communication is performed, the process progresses to the step S1102, which the data is transmitted or received, and, when the data communication is not performed, the safety communication session is finished (S1108). In the determination of the step S1104, when it is determined that the electronic gift is not generated, the terminal device 10 performs the step S1107 without performing the processes of the step S1105 and the step S1106.

In the step S1103, when the electronic gift rule corresponding to the URL of the transmitted/received data does not exist in the electronic gift rules held in the electronic gift rule management means 12 and the electronic gift rule cannot be specified, the terminal device 10 performs the step S1107 without performing the step S1104, the step S1105 and the step S1106.

In the present embodiment, the history information held in the history management means 15 is notified to the settlement means 32 of the service provision server 30 as information indicating the result of the process of reflecting the electronic gift on the electronic value. The history information is notified after the mutual authentication between the terminal device 10 and the settlement means 32 and the settlement means 32 of the service provision server 30 verifies the contents of the history information received from the terminal device 10, tabulates them in each information server, and performs the settlement process of the amount of the electronic gift reflected on the electronic value with the information server 20. At this time, the service provision server 30 specifies the electronic gift rule based on the electronic gift rule identification information 1003 of the history information and verifies that the process of reflecting the electronic gift on the electronic value indicated by the history is correctly performed based on the electronic gift rule.

Since the generation of the electronic gift is controlled by the contents of the history information held in the history management means 15 of the terminal device 10, it is possible to provide different electronic gifts to the users based on the history of access to the information server 20 without holding the personal information of the user or the access log in the information server.

Although the CPU of the terminal device 10 executes the software modules corresponding to the respective functions of the communication means 11, the electronic gift rule management means 12, the data processing means 13, the value management means 14 and the history management means 15 in the above description, the CPU of the security device including a tamper-resistant mechanism such as an IC card mounted in the terminal device may execute the software modules corresponding to the respective functions of the secure communication means 11, the electronic gift rule management means 12, the data processing means 13, the value management means 14 and the history management means 15.

Figure 12:
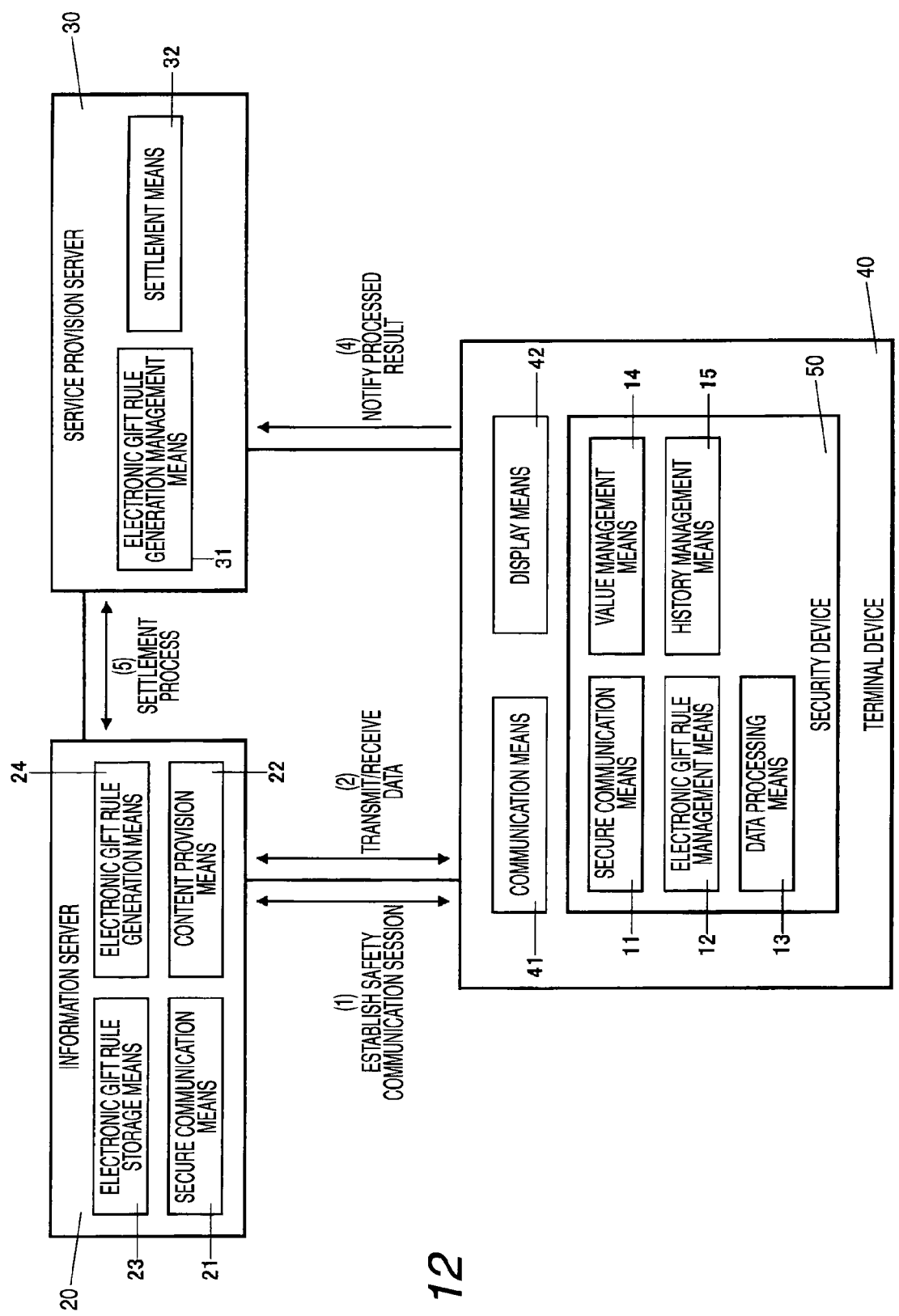
FIG. 12 is a view showing a block configuration of the information provision system when the terminal device includes a security device, according to the second embodiment of the present invention.

FIG. 12 shows the configuration of the terminal device 40 and the configuration of the information provision system in this case. The terminal device 40 includes communication means 41 for performing data communication with the information server 20 and display means 42 for displaying the result of the data communication, and the security device 50 includes the secure communication means 11, electronic gift rule management means 12, the data processing means 13, the value management means 14 and the history management means 15.

Actually, the software modules including the respective functions such as the secure communication means 11, electronic gift rule management means 12, the data processing means 13, the value management means 14 and the history management means 15 are stored in storage means such as a ROM or an EEPROM of the security device 50 and executed by the CPU of the security device 50.

The configuration of the information provision system is identical to that of the information provision system described with reference to FIG. 9 except the configuration of the terminal device 40.

The operation of the components of the information provision system shown in FIG. 12 is identical to that of the information provision system described with reference to FIG. 9 except that the secure communication means 11 of the security device 50 establishes the safety communication session with the information server via the communication means 41 and the security device 50 performs the process of generating the electronic gift and reflecting the electronic gift on the electronic value.

Figure 13:
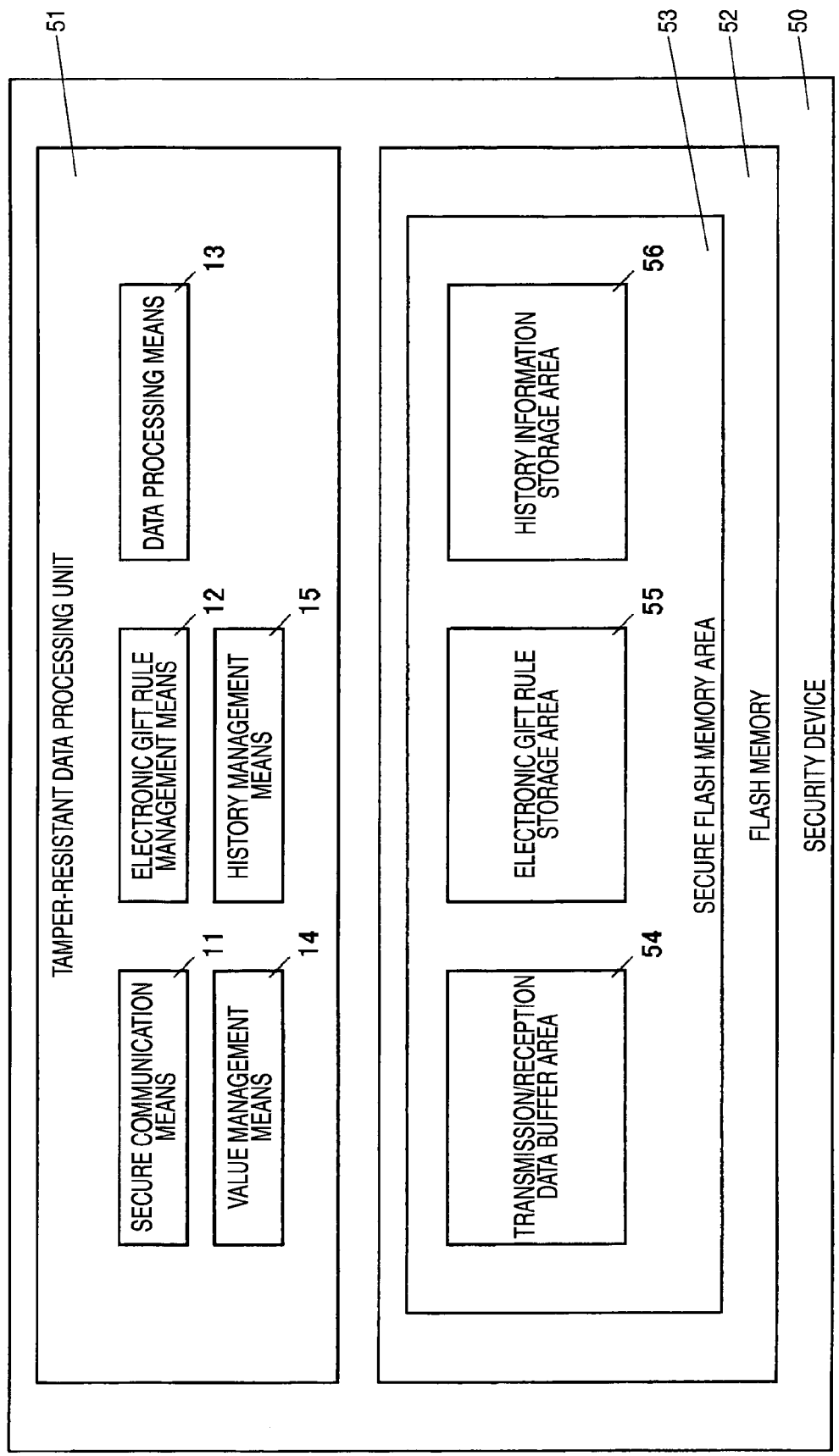
FIG. 13 is a view showing an example of a block configuration of the security device according to the second embodiment of the present invention.

FIG. 13 is an example of the configuration of the security device 50 in this case. The configuration of the security device is identical to that of the security device 50 described with reference to FIG. 8 except that a software module corresponding to the history management means 15 is added to the software modules executed by the CPU of the tamper-resistant data processing unit 51 and a history information storage area 56 for storing the history information of the process of reflecting the electronic gift on the electronic value is added to the secure flash memory area 53. The history information held and managed by the history management means 15 is stored in the history information storage area 56.

The data of the secure flash memory area 53 is managed to be accessed only by the tamper-resistant data processing unit 51 and thus, in the secure flash memory area 53, the confidentiality similar to that of the tamper-resistant data processing unit 52 is maintained. Accordingly, it is possible to prevent an improper action for improperly generating the electronic gift by falsifying the history information.

Since the process of generating the electronic gift and reflecting the electronic gift on the electronic value is performed in the security device 50 having higher tamper resistance, the safety of the electronic gift service is improved.

Third Embodiment

An information provision system according to a third embodiment of the present invention can provide an electronic gift service based on a variety of condition settings.

Figure 14:
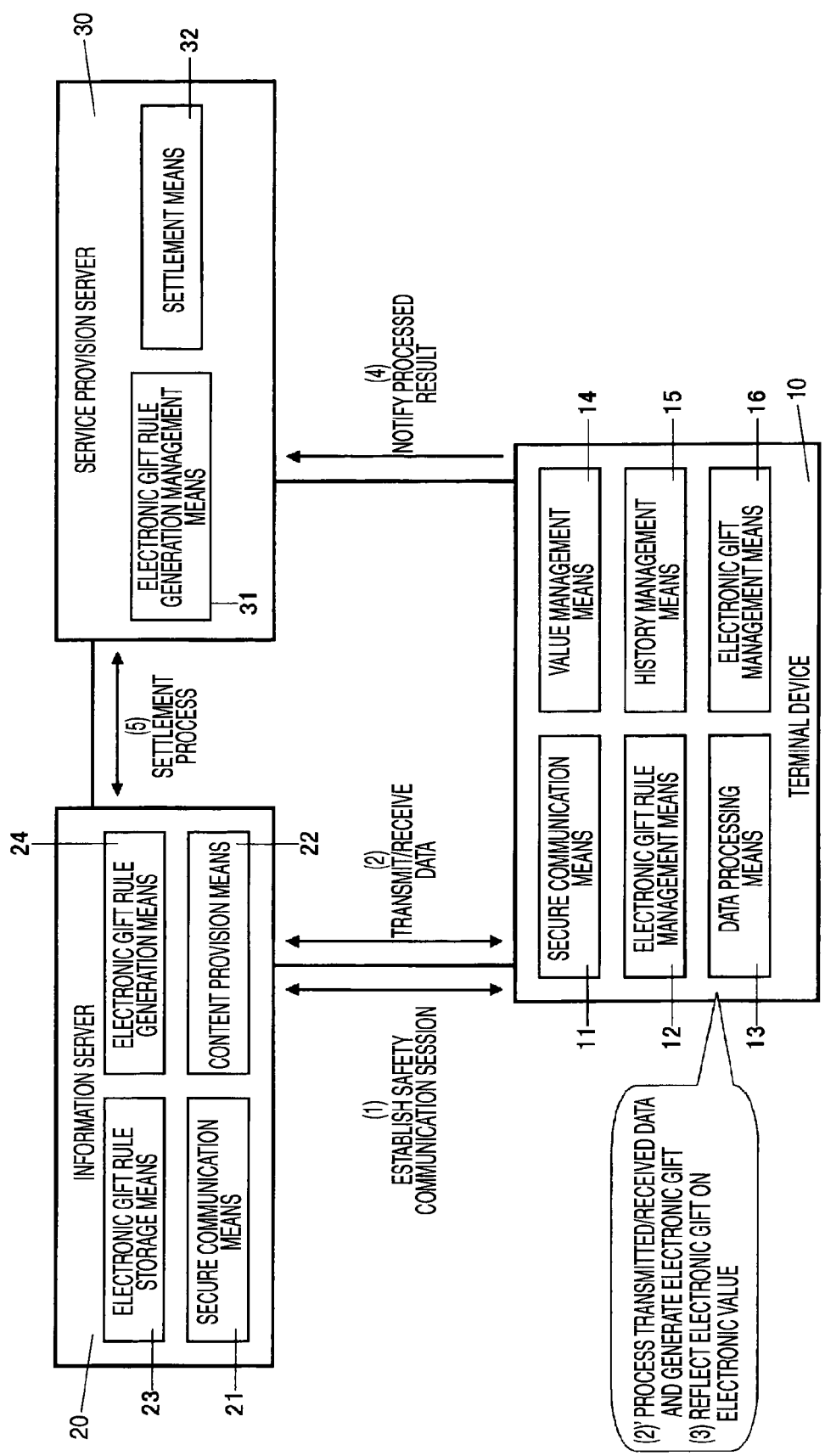
FIG. 14 is a view showing a block configuration and the operation sequence of the information provision system according to a third embodiment of the present invention.

FIG. 14 shows the configuration of the information provision system according to the present embodiment, which is identical to that of the information provision system according to the second embodiment described with reference to FIG. 9 except that electronic gift management means 16 for temporarily holding the electronic gift generated by the data processing means 13 and timely reflecting the electronic gift on the electronic value is added to the terminal device 10.

Actually, software modules including the respective functions of the secure communication means 11, the electronic gift rule management means 12, the data processing means 13, the value management means 14, the history management means 15 and the electronic gift management means 16 are stored in a storage means such as a ROM, an EEPROM or a hard disc of the terminal device 10 and executed by the CPU of the terminal device 10. Such software modules are protected by tamper resistance such that improper falsification is prevented.

The operation of the components of the information provision system shown in FIG. 14 is identical to that of the information provision system described with reference to FIG. 9 except that the electronic gift generated by the terminal device 10 is temporarily held in the electronic gift management means 16 and reflected on the electronic value based on the electronic gift rule and the history information held in the history management means.

In the present embodiment, in the electronic gift reflection condition 204 of the electronic gift rule, a condition related to the date and time when the electronic gift is reflected on the electronic value, a condition related to the check of the electronic gift held in the electronic gift management means 16, the unit of the amount of the electronic gift reflected on the electronic value, and a condition related to the contents of the history information held in the history management means 15 are set.

For example, when the condition related to the date and time when the electronic gift is reflected on the electronic value is set in the electronic gift reflection condition 204, the electronic gift held in the electronic gift management means 16 is reflected on the electronic gift on the date and time which satisfy the electronic gift reflection condition 204. When the end of the month is specified as the date and time of the electronic gift reflection condition 204, the electronic gift held in the electronic gift management means 16 is reflected on the electronic value at the end of the month.

When the condition related to the check of the electronic gift held in the electronic gift management means 16 is set in the electronic gift reflection condition 204, the electronic gift held in the electronic gift management means 16 is reflected on the electronic value when the electronic gift which satisfies the electronic gift reflection condition 204 is held in the electronic gift management means 16. When the check of the electronic gift is specified in the electronic gift reflection condition 204, the electronic gift is reflected on the electronic value when the specified electronic gift is held in the electronic gift management means 16.

Figure 15:
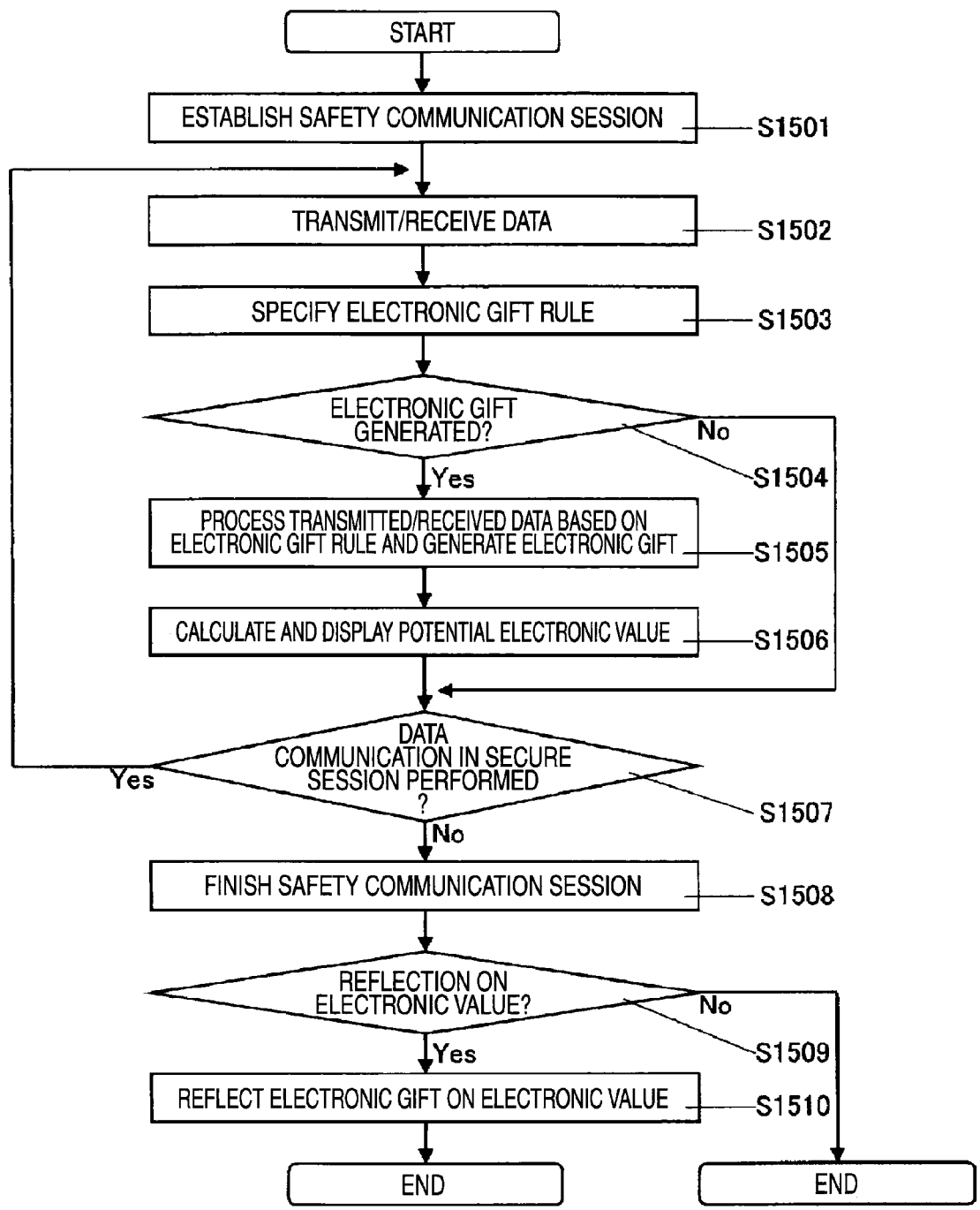
FIG. 15 is a flowchart showing a process of generating an electronic gift of a terminal device and reflecting the electronic gift on an electronic value according to the third embodiment of the present invention.

The terminal device 10 according to the present embodiment performs a process of generating the electronic gift and reflecting the electronic gift on the electronic value according to a process shown in FIG. 15.

First, the terminal device 10 establishes the safety communication session with the information server 20 using the secure communication means 11 (S1501).

Next, the terminal device 10 transmits or receives data to or from the information server 20 (S1502). When the data is transmitted, an electronic gift rule is specified in the electronic gift rules held in the electronic gift rule management means 12 based on the URL of a transmission destination and, when the data is received, the electronic gift rule is specified based on the URL of a transmission source (S1503). At this time, the terminal device 10 specifies the electronic gift rule by checking the URL and the information server domain 202 of the electronic gift rule or the target data URI 212.

Next, the data processing means 13 of the terminal device 10 analyzes contents of the specified electronic gift rule and determines whether the electronic gift can be generated based on the history information held in the history management means 15 and the analyzed electronic gift rule (S1504). When it is determined that the electronic gift can be generated, the data processing means 13 processes the transmitted/received data based on a method indicated by the electronic gift calculation method 203 of the electronic gift rule and the history information held in the history management means 15 and generates and holds the electronic gift on the electronic gift management means 16 (S1505).

The terminal device 10 calculates and displays the contents of a potential electronic value when the electronic gift held in the electronic gift management means is reflected on the electronic value (S1506).

Next, the terminal device 10 determines whether the data communication is performed under the safety communication session (S1507). When the data communication is performed, the process progresses to the step S1502, which the data is transmitted or received, and, when the data communication is not performed, the safety communication session is finished (S1508). In the determination of the step S1504, when it is determined that the electronic gift is not generated, the terminal device 10 performs the step S1507 without performing the processes of the step S1505 and the step S1506.

After the safety communication session is finished (1508), the terminal device 10 determines whether the electronic gift held in the electronic gift management means 16 can be reflected on the electronic value based on the electronic gift reflection condition 204 of the electronic gift rule and the history information held in the history management means 15 (S1509) and reflects the electronic gift on the electronic value indicated by the electronic value identification information 205 when it is determined that the electronic gift can be reflected on the electronic value (S1510).

In the determination of the step S1509, when it is determined that the electronic gift cannot be reflected on the electronic value, the terminal device 10 completes the process. Since the condition related to the date and time when the electronic gift is reflected on the electronic value in the electronic gift reflection condition 204 is not satisfied, when it is determined that the electronic gift is not reflected on the electronic value, the terminal device 10 reflects the electronic gift on the electronic value at the time point which satisfies the condition.

In the step S1503, when the electronic gift rule corresponding to the URL of the transmitted/received data does not exist in the electronic gift rules held in the electronic gift rule management means 12 and the electronic gift rule cannot be specified, the terminal device 10 performs the step S1507 without performing the step S1504, the step S1505 and the step S1506.

Since the electronic gift management means 16 for temporarily holding the electronic gift generated by the terminal device 10 is provided and the electronic gift can be timely reflected on the electronic value based on the electronic gift rule and the history information, it is possible to provide an electronic gift service based on the various condition settings. By displaying the contents of the potential electronic value on which the electronic gift is reflected to the user, it is possible to prompt the user to perform the data communication with the information server.

Although the CPU of the terminal device 10 executes the software modules corresponding to the respective functions of the communication means 11, the electronic gift rule management means 12, the data processing means 13, the value management means 14, the history management means 15 and the electronic gift management means 16 in the above description, the CPU of the security device including a tamper-resistant mechanism such as an IC card mounted in the terminal device may execute the software modules corresponding to the respective functions of the secure communication means 11, the electronic gift rule management means 12, the data processing means 13, the value management means 14, the history management means 15, and the electronic gift management means 16.

Figure 16:
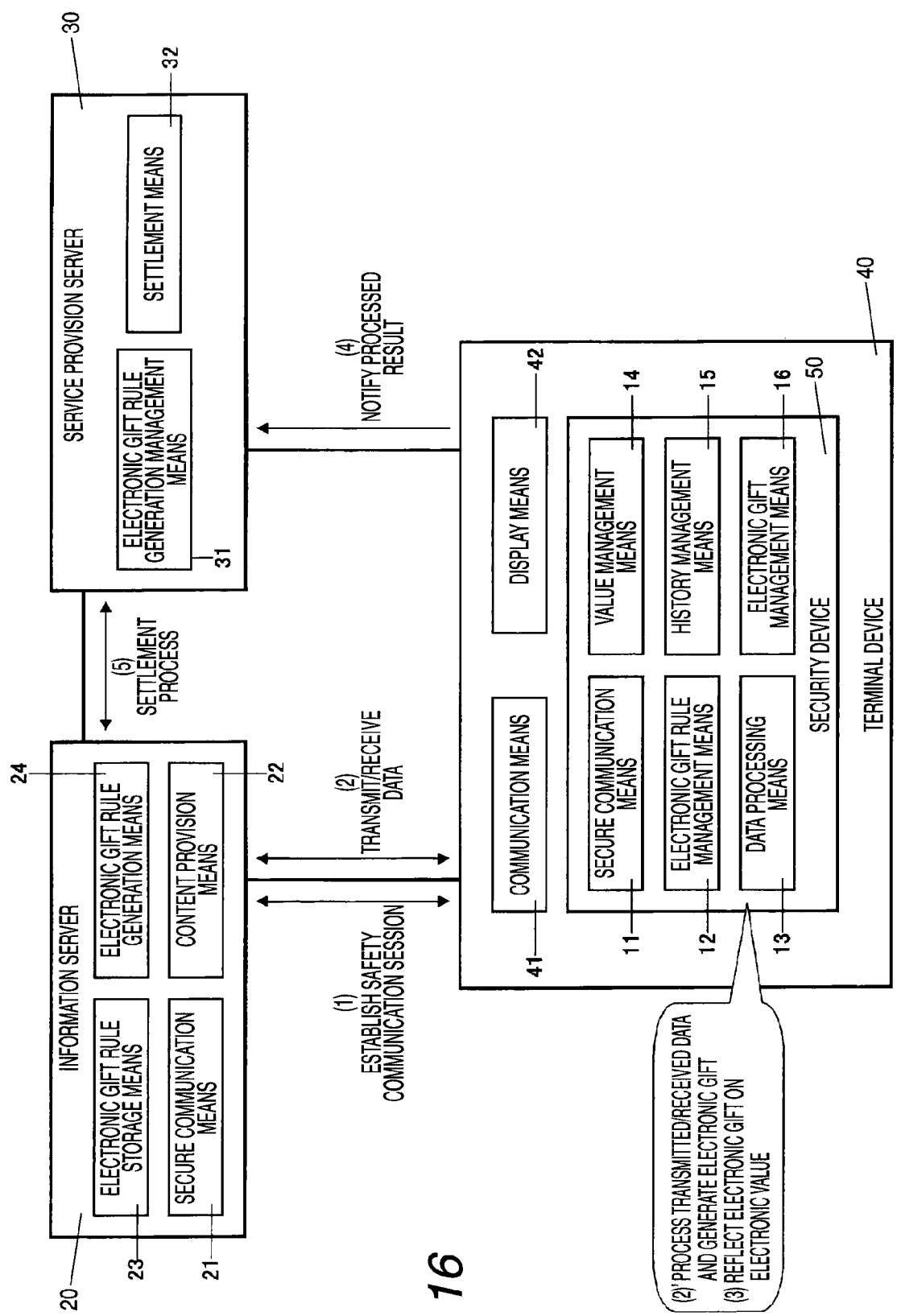
FIG. 16 is a view showing a block configuration of the information provision system when the terminal device includes a security device according to the third embodiment of the present invention.

FIG. 16 shows the configuration of the terminal device 40 and the configuration of the information provision system in this case. The terminal device 40 includes communication means 41 for performing data communication with the information server 20 and display means 42 for displaying the result of the data communication, and the security device 50 includes the secure communication means 11, electronic gift rule management means 12, the data processing means 13, the value management means 14, the history management means 15 and the electronic gift management means 16.

Actually, the software modules including the respective functions such as the secure communication means 11, electronic gift rule management means 12, the data processing means 13, the value management means 14, the history management means 15 and the electronic gift management means 16 are stored in storage means such as a ROM or an EEPROM of the security device 50 and executed by the CPU of the security device 50. The configuration of the information provision system is identical to that of the information provision system described with reference to FIG. 14 except the configuration of the terminal device 40.

The operation of the components of the information provision system shown in FIG. 16 is identical to that of the information provision system described with reference to FIG. 14 except that the secure communication means 11 of the security device 50 establishes the safety communication session with the information server via the communication means 41 and the security device 50 performs the process of generating the electronic gift and reflecting the electronic gift on the electronic value.

Figure 17:
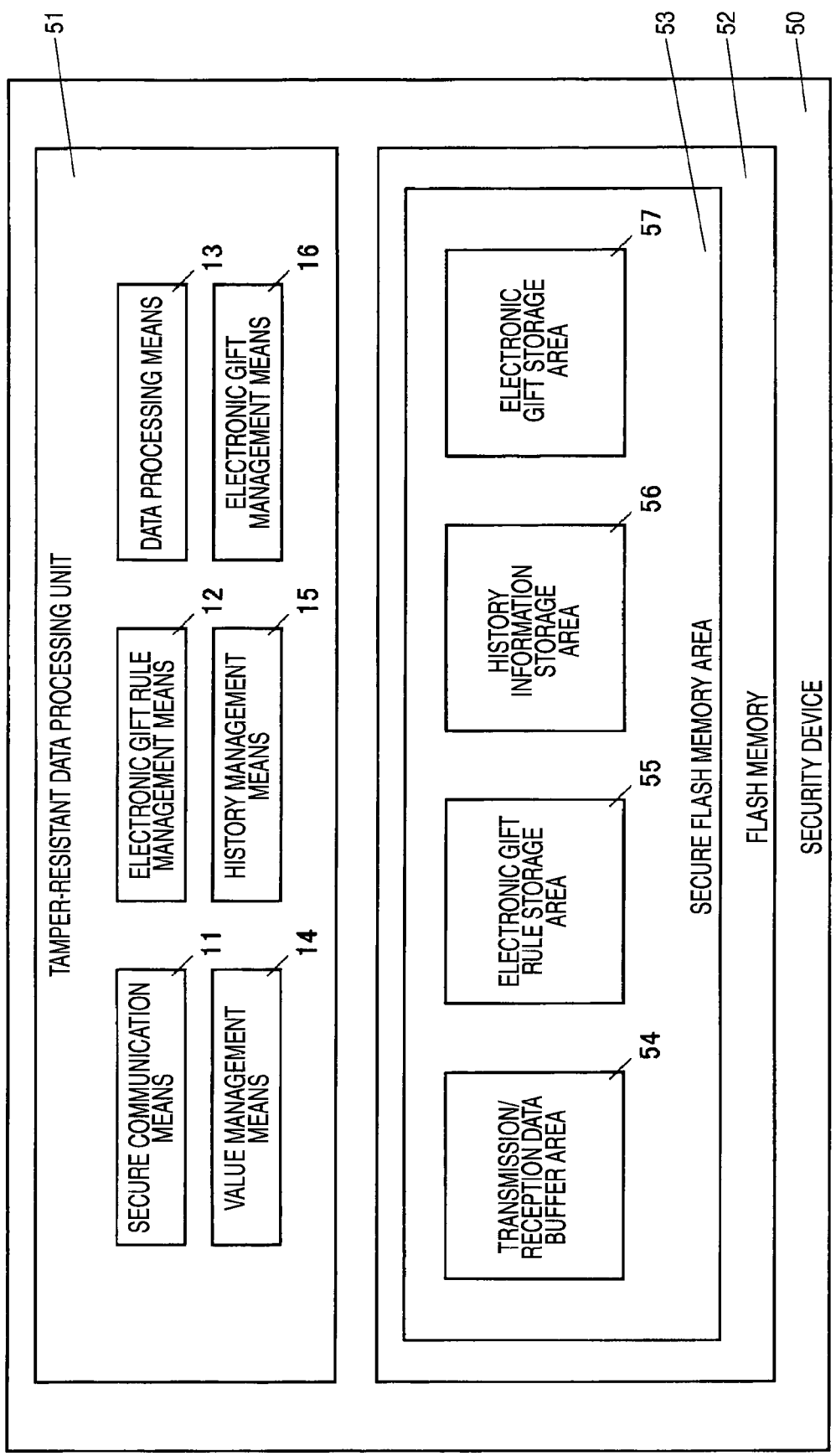
FIG. 17 is a view showing an example of a block configuration of the security device according to the third embodiment of the present invention.

FIG. 17 is an example of the configuration of the security device 50 in this case. The configuration of the security device is identical to that of the security device 50 described with reference to FIG. 13 except that a software module corresponding to the electronic gift management means 16 is added to the software modules executed by the CPU of the tamper-resistant data processing unit 51 and an electronic gift storage area 57 for temporarily storing the electronic gift generated by the data processing means 13 is added to the secure flash memory area 53. The electronic gift held and managed by the electronic gift management means 16 is stored in the electronic gift storage area 57.

The data of the secure flash memory area 53 is managed to be accessed only by the tamper-resistant data processing unit 51 and thus, in the secure flash memory area 53, the confidentiality similar to that of the tamper-resistant data processing unit 52 is maintained. Accordingly, it is possible to prevent an improper action for improperly generating the electronic gift by falsifying the history information.

Since the process of generating the electronic gift and reflecting the electronic gift on the electronic value is performed in the security device 50 having higher tamper resistance, the safety of the electronic gift service is improved.

First Example

As the first example of the present invention, an information provision system for providing electronic money to a user according to the capacity of data transmitted/received to/from an information server will be described.

Figure 18:
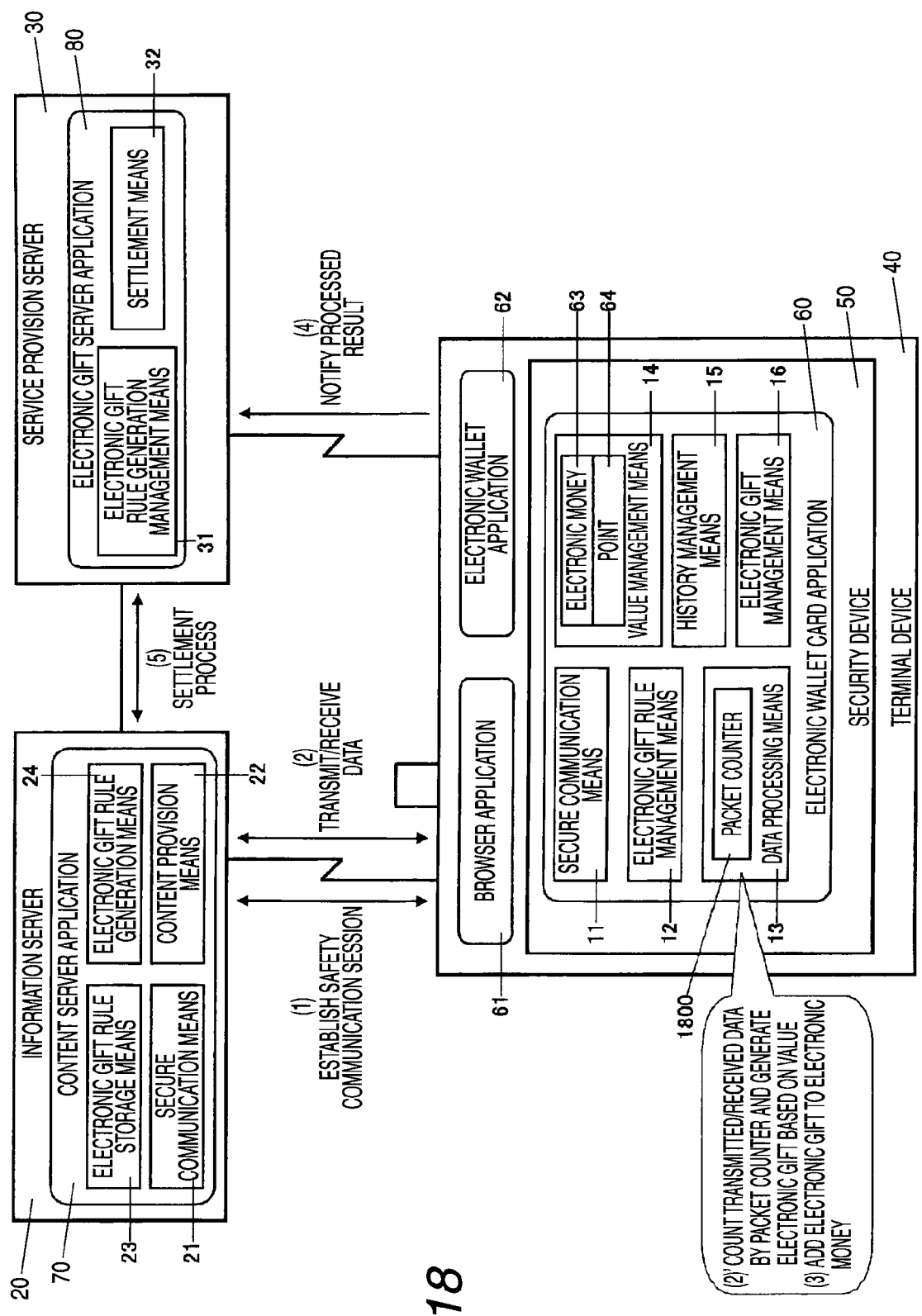
FIG. 18 is a view showing a block configuration and the operation sequence of the information provision system for providing electronic money to a user according to a capacity of data transmitted/received to/from an information server, according to the first embodiment of the present invention.

As shown in FIG. 18, the basic configuration of the information provision system is identical to that of the information provision system shown in FIG. 16 according to the third embodiment.

The information provision system according to the present embodiment includes a service provision server 30 of an electronic gift service provider who provides an electronic value service and an electronic gift service, an information server 20 of a site manager who affiliates with an electronic gift service business to provide information in the Internet, and a terminal device 40 such as a mobile telephone or a personal computer used by a user.

The information server 20 of the site manager includes a content server application 70 including secure communication means 21 which establishes a safety communication session and performs data communication with the terminal device 40, content provision means 22 for providing multimedia data such as HTML data or moving-image data with respect to a request from the terminal device 40, an electronic gift rule storage means 23 for storing an electronic gift rule transmitted to the terminal device 40, and an electronic gift rule generation means 24 for generating the electronic gift rule transmitted to the terminal device 40 as the software modules.

The service provision server 30 of the electronic gift service provider includes an electronic gift server application 80 including electronic gift rule generation management means 31 for generating, holding and managing the electronic gift rule for defining an electronic gift condition and settlement means 32 for performing a settlement process with the information server 20 of the site manager based on history information received from the terminal device 10 as the software modules.

The terminal device 40 includes a browser application 61 for holding the security device 50 and displaying information acquired via the Internet and an electronic wallet application 62 for displaying the contents of the electronic gift and the electronic value held in the security device 50 and realizing a user interface function of a payment process of the electronic values.

Figure 19:
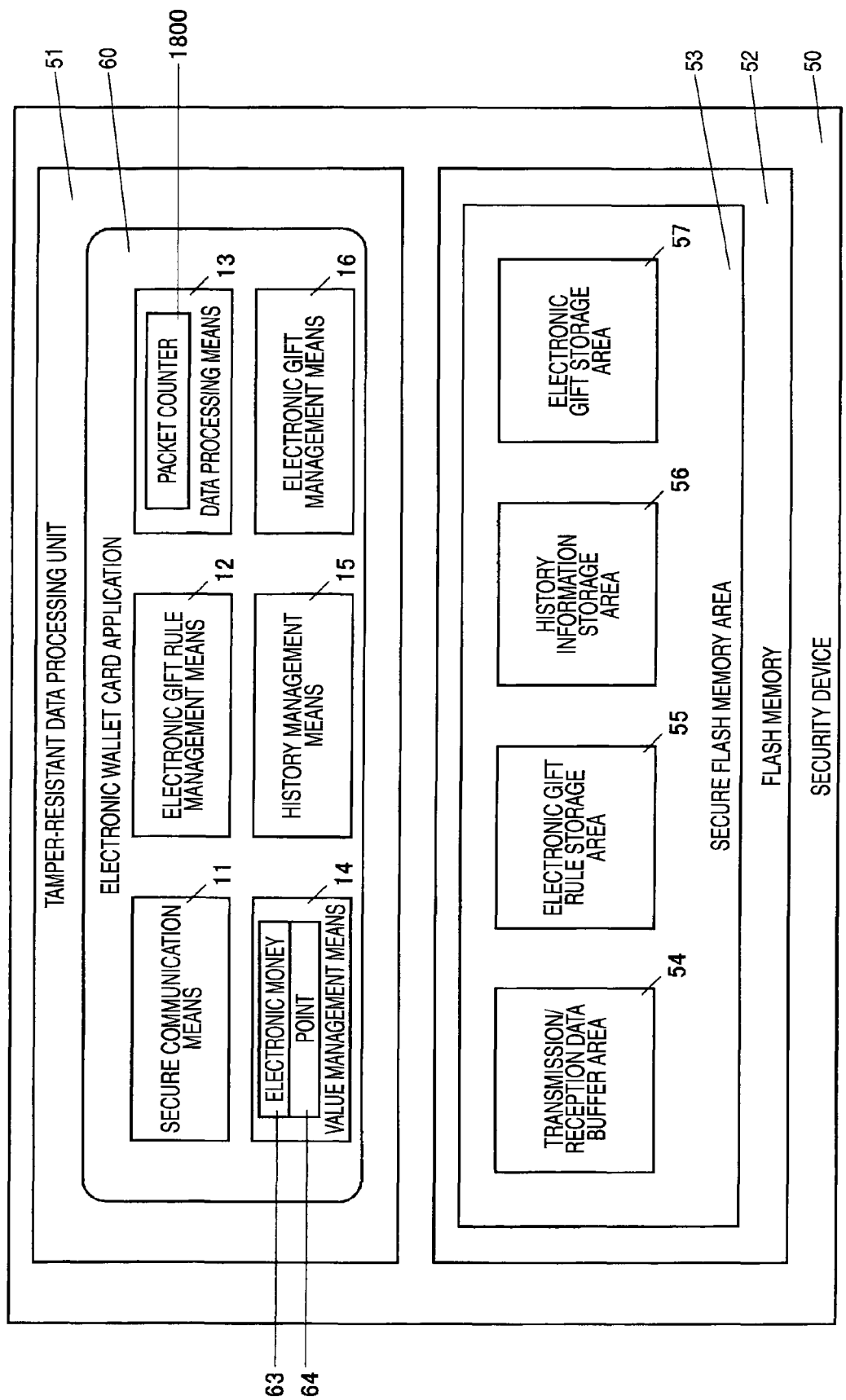
FIG. 19 is a view showing a block configuration of a security device according to the first embodiment of the present invention.

As shown in FIG. 19, the security device 50 includes an electronic wallet card application 60 for performing a process of managing the electronic value, generating the electronic gift, and reflecting the electronic gift on the electronic value, and the electronic wallet card application 60 includes the secure communication means 11, the electronic gift rule management means 12, the data processing means 13, the value management means 14, the history management means 15 and the electronic gift management means 16 as the software modules. Actually, the electronic wallet card application 60 is stored in a storage means such as a ROM or an EEPROM of the security device 50 and executed by the CPU of the security device 50.

The functions of the secure communication means 11, the electronic gift rule management means 12, the data processing means 13, the value management means 14, the history management means 15 and the electronic gift management means 16 are equal to those of the secure communication means 11, the electronic gift rule management means 12, the data processing means 13, the value management means 14, the history management means 15 and the electronic gift management means 16 according to the third embodiment shown in FIGS. 16 and 17. The data processing means 13 further includes a packet counter 1800 for counting the packet number of the data transmitted/received to/from the information server 20. In the value management means 14, electronic money 63 and a royalty point 64 are managed as the electronic value. In the value management means 14, the other kind of electronic value such as mobile telephone prepaid money which can be used in payment of the call charge of the mobile telephone may be managed.

The electronic wallet card application 60 is issued by the electronic gift service provider for developing the electronic gift service business. The electronic gift service provider stores the electronic wallet card application 60 in the security device 50 and distributes the security device 50 to the user or provides the electronic wallet card application 60 on-line such that the user installs the electronic wallet card application 60 in his/her security device 50. In the electronic wallet card application 60, the public key of the CA server for verifying the validity of the electronic gift rule previously set by the electronic gift service provider and the electronic gift rule received from the information server 20 or the service provision server 30 is included.

The browser application 61 of the terminal device 40 affiliates with the electronic wallet card application 60 of the security device 50, receives and displays the data from the information server 20, and transmits input information. The electronic wallet application 62 of the terminal device 40 displays and operates the electronic value managed by the electronic wallet card application 60 of the security device 50.

The data configuration of the electronic gift rule is shown in FIG. 2(*a*) or 2(*b*) and described in an XML format. In the present embodiment, an upper limit of the sum of the conversion rate of the packet number and the electronic value (for example, "0.01 JYN" when one packet is converted into 0.01 Yen and the amount of the generated electronic gift is defined in the electronic gift calculation method 203, the reflection of the electronic gift on the electronic value in the unit of 1 Yen is defined in the electronic gift reflection condition 204, and the electronic money 63 is defined as the electronic value, on which the electronic gift is reflected, in the electronic value identification information 205.

A plurality of electronic gift rules generated by the service provision server 30 or the information server 20 is stored in the electronic gift rule storage means 23 of the information server 20. In the case of the electronic gift rule generated by the service provision server 30, the electronic gift rule having the data configuration shown in FIG. 5(*a*) or 5(*b*) is stored and, in the case of the electronic gift rule generated by the information server 20, the electronic gift rule having the data configuration shown in FIG. 5(*c*) is stored.

Even when the information server domain 203 or the target data URI is identical, a plurality of electronic gift rules having different combinations among the electronic value identification information 205, the conversion rate of the electronic gift calculation method 203 and the upper limit of the electronic gift are stored in the electronic gift rule storage means 23. The information server 20 selects the electronic gift rule based on profile information of the terminal device 40 such as the kind of the terminal and transmits the electronic gift rule to the terminal device 40. In the electronic value identification information 205 of the electronic gift rule, plural pieces of identification information may be specified. In this case, it is determined on which electronic value the electronic gift is reflected, by specification of the user in the terminal device 40.

The operation sequence of the information provision system according to the present embodiment is as follows.

(1) When a user has access to the information server 20 for providing the electronic gift using the browser application 61 of the terminal device 40, the terminal device 40 transmits an access request to the information server 20 and establishes a secure session between the secure communication means 11 of the security device 50 and the secure communication means 21 of the information server 20. At this time, the terminal device 40 transmits the profile information of the terminal device such as the kind information to the information server 20, the information server 20 selects an electronic gift rule from the plurality of electronic gift rules having different conditions stored in the electronic gift rule storage means 21 based on the access request and the received profile information and transmits the electronic gift rule of the security device 50 of the terminal device 40, and the security device 50 verifies and stores the received electronic gift rule in the electronic gift rule management means 12.

(2) Data is encrypted and transmitted/received under the safety communication session established between the terminal device 40 and the information server 20. At this time, in the terminal device 40, the secure communication means 11 of the secure device 50 decodes the received data and encrypts the transmitted data, and the decoded received data is displayed by the browser application 61.

(2)' At this time, the data processing means 13 of the security device 50 processes the data transmitted/received to/from the information server based on the electronic gift rule in the electronic gift rule management means and generates the electronic gift. The data processing means 13 verifies that the sum of the amounts of the electronic gifts generated based on the same electronic gift rule does not reach the upper limit defined by the electronic gift rule by referring to the history information held in the history information management means 15, counts the packet number of the data transmitted/received to/from the information server using the packet counter 1800, decides the value of the electronic gift generated by multiplying the counted packet number by the conversion rate indicated by the electronic gift calculation method 203, generates the electronic gift, and stores the electronic gift in the electronic gift management means 16 (for example, the electronic gift of 1 Yen is generated when the conversion rate is "0.01 JYN" and the packet number of the transmitted/received data is 100). When the sum of the values of the electronic gifts generated based on the same electronic gift rule reaches the upper limit defined by the electronic gift rule, the data processing means 13 does not generate the electronic gift.

(3) The electronic gift management means of the security device 50 reflects the generated electronic gift on the electronic value indicated by the electronic value identification information 205 of the electronic gift rule, that is, the electronic money 63 (1 Yen is added to the electronic money 63 when the amount of the electronic gift is 1 Yen and the electronic value is the electronic money) and the history management means 15 holds the history information of the process of reflecting the electronic gift on the electronic value. At this time, the electronic gift management means 16 does not perform the process of reflecting the electronic gift on the electronic value when the sum of the amounts of the electronic gifts held in the electronic gift management means 16 based on the electronic gift reflection condition 204 of the electronic gift rule is less than 1 Yen and performs the reflection process when the sum of the values of the electronic gifts is greater than or equal to 1 Yen.

(4) As the result of the process of reflecting the electronic gift on the electronic value, the terminal device 40 sends the history information held in the history management means 15 of the security device 50 to the settlement means 32 of the service provision server 30. In this case, the security device 50 and the settlement means 32 perform the mutual authentication and then the history management means 15 performs the electronic gift process and transmits the history information to the service provision server 30 within a predetermined period. When the history information which is not transmitted to the settlement means 32 of the service provision server 30 within the predetermined period exists after the reflection process is performed, the value management means 14 stops the use of the electronic value, and, when the history information is transmitted to the settlement means 32 of the service provision server 30, the value management means 14 allows the use of the electronic value again.

The data processing means 13 stops the process of generating the electronic gift when the sum of the "amounts of the reflected electronic values" of the history information which is not transmitted to the service provision server 30 exceeds a predetermined amount (for example, the amount of money) even within the predetermined period and resumes the process of generating the electronic gift when the history information is transmitted to the settlement means 32 of the service provision server 30.

(5) The settlement means 32 of the service provision server 30 verifies the history information received from the terminal device 40, tabulates the history information in each information server, and performs the settlement process of the amount reflected on the electronic value with the information server 20. In this case, the site manager of the information server 20 pays the return for the amount of money reflected on the electronic money by the settlement process to the electronic gift service provider of the service provision server 30.

Figure 20:
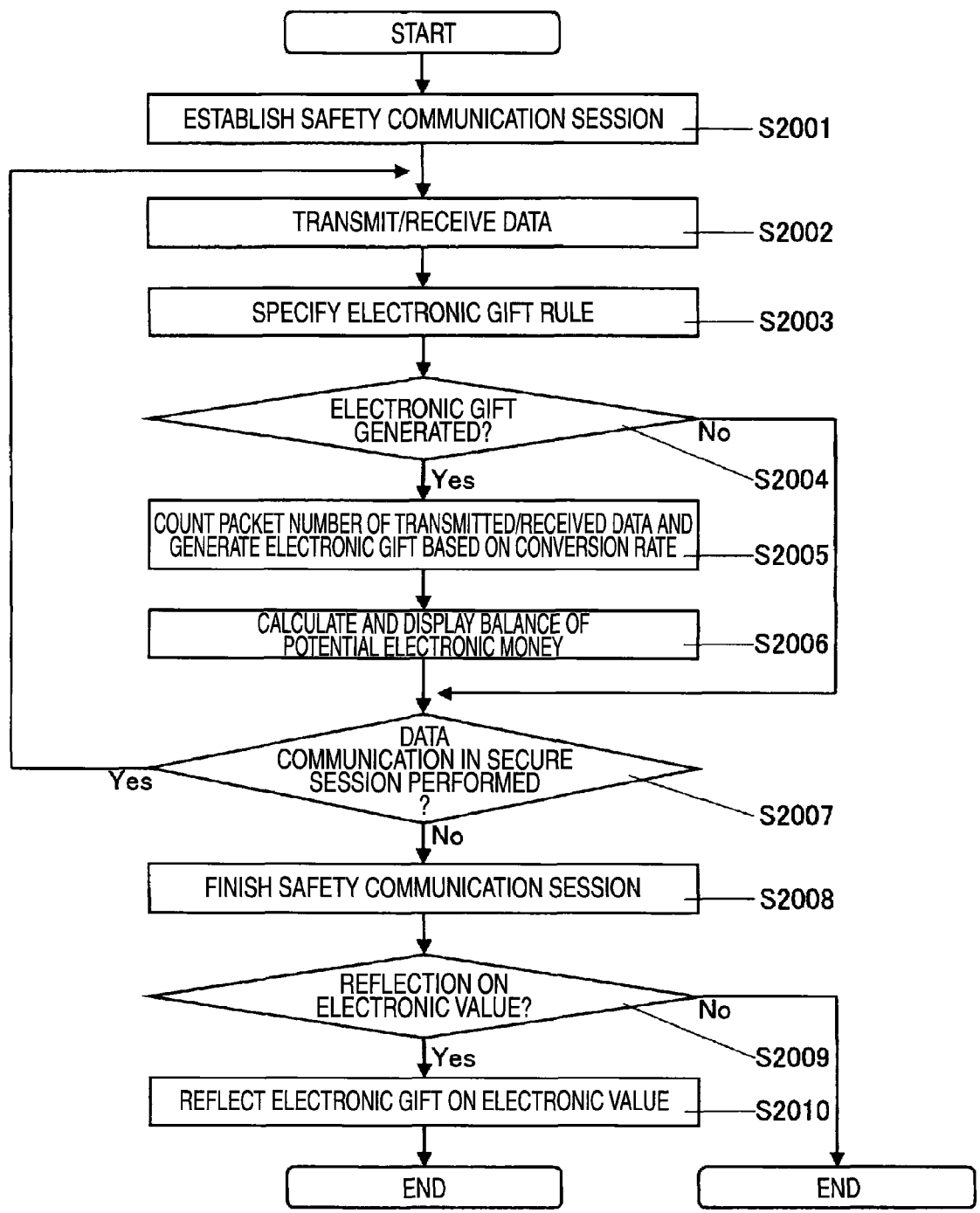
FIG. 20 is a flowchart showing a process of generating an electronic gift of the terminal device and reflecting the electronic gift on an electronic value, according to the first embodiment of the present invention.

In the operation sequence of the information provision system described above, the terminal device 40 according to the present embodiment performs the process of generating the electronic gift and reflecting the electronic gift on the electronic value according to a process shown in FIG. 20.

First, the terminal device 40 establishes the safety communication session with the information server 20 using the secure communication means 11 (S2001).

Next, the terminal device 40 transmits or receives data to or from the information server 20 (S2002). When the data is transmitted, an electronic gift rule is specified in the electronic gift rules held in the electronic gift rule management means 12 based on the URL of a transmission destination and, when the data is received, the electronic gift rule is specified based on the URL of a transmission source (S2003). At this time, the terminal device 40 specifies the electronic gift rule by checking the URL and the information server domain 202 of the electronic gift rule or the target data URI 212.

Next, the data processing means 13 of the terminal device 40 analyzes contents of the specified electronic gift rule, determines whether the electronic gift can be generated based on the history information held in the history management means 15 and the analyzed electronic gift rule (S2004). When it is determined that the electronic gift can be generated, the packet number of the transmitted or received data is counted using the packet counter 1800 based on the electronic gift calculation method 203 of the electronic gift rule and the history information held in the history management means 15, the amount of the electronic gift generated by multiplying the counted packet number by the conversion rate indicated by the electronic gift calculation method 203 is obtained, and the electronic gift is generated and held in the electronic gift management means 16 (S2005). The terminal device 40 calculates and displays the contents of the potential electronic value when the electronic gift held in the electronic gift management means is reflected on the electronic value (S2006).

Next, the terminal device 40 determines whether the data communication is performed under the safety communication session (S2007). When the data communication is performed, the process progresses to the step S2002, which the data is transmitted or received, and, when the data communication is not performed, the safety communication session is finished (S2008). In the determination of the step S2004, when it is determined that the electronic gift is not generated, the terminal device 40 performs the step S2007 without performing the processes of the step S2005 and the step S2006.

After the safety communication session is finished (S2008), the terminal device 40 determines whether the electronic gift held in the electronic gift management means 16 can be reflected on the electronic value based on the electronic gift reflection condition 204 of the electronic gift rule and the history information held in the history management means 15 (S2009). When the sum of the amounts of the electronic gift held in the electronic gift management means 16 is less than 1 Yen, the process of reflecting the electronic gift on the electronic value is not performed, and, when the sum is greater than or equal to 1 Yen, the reflection process is performed. In the determination of the step S2009, when it is determined that the electronic gift can be reflected on the electronic value, the electronic gift management means 16 reflects the electronic gift on the electronic value indicated by the electronic value identification information 205 of the electronic gift rule, that is, the electronic money 63, and the history management means 15 holds the history information of the process of reflecting the electronic gift on the electronic value (S2010). In the determination of the step S2009, when it is determined that the electronic gift is not reflected on the electronic value, the terminal device 40 completes the process. In the step S2003, when the electronic gift rule corresponding to the URL of the transmitted/received data does not exist in the electronic gift rules held in the electronic gift rule management means 12 and the electronic gift rule cannot be specified, the terminal device 40 performs the step S2007 without performing the step S2004, the step S2005 and the step S2006.

Figure 21:
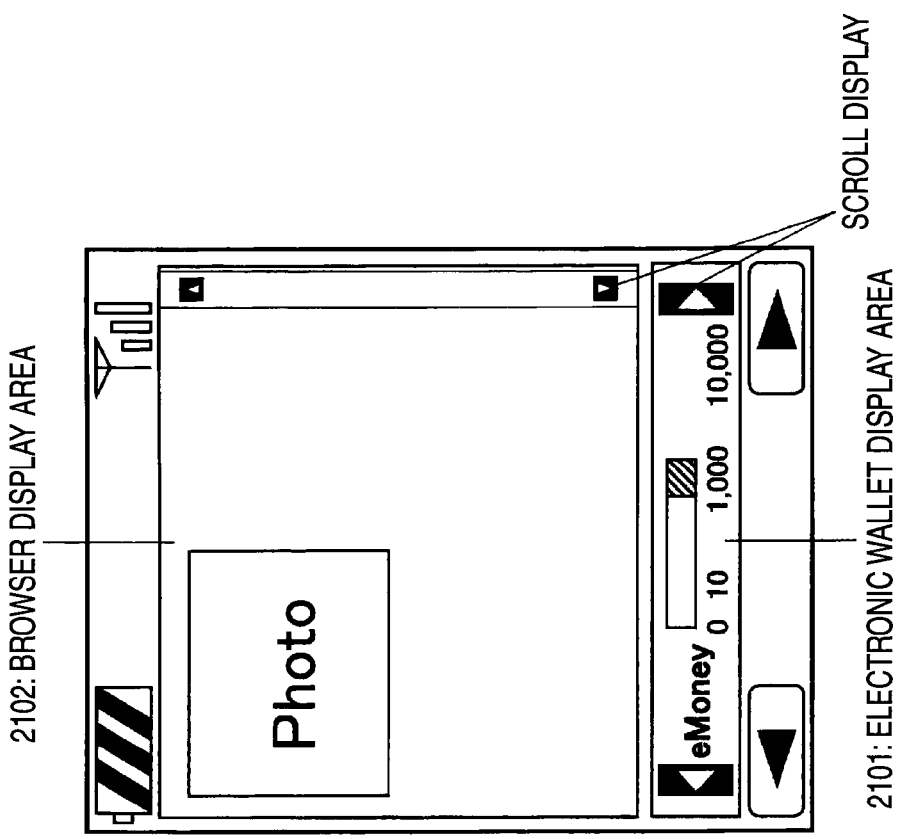
FIG. 21(*a*) is a view showing an example of a screen displayed on the terminal device according to the first embodiment of the present invention and FIG. 21(*b*) is a view showing an example of a screen displayed on the terminal device when contents of the electronic value is displayed as an image, according to the first embodiment of the present invention.
Figure 21:
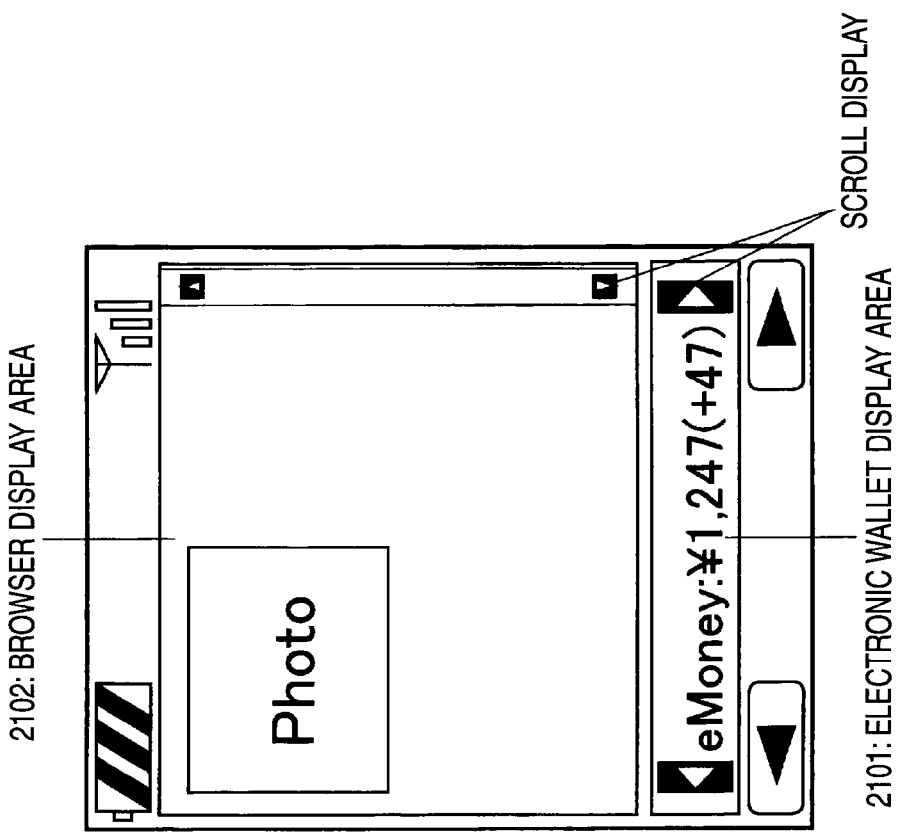

FIGS. 21(*a*) and 21(*b*) show an example of a screen displayed on the terminal device 40 in the step S2006. In this case, a browser display area 2102 and an electronic wallet display area 2101 are separated in the screen. The contents which are sent from the information server 20 to the browser application 61 are displayed in the browser display area 2102 and the contents of the electronic gift and the electronic value managed by the electronic wallet application 62 are displayed in the electronic wallet display area 2101. That is, the contents and the contents of the electronic value received from the information server 20 are simultaneously displayed and the user can confirm the contents of the electronic value while transmitting/receiving the data to/from the information server 20. For example, in the example shown in FIG. 21(*a*), "eMoney: ¥1, 247(+47)" indicates that 47 Yen is added and the amount of the electronic money becomes 1,247 Yen when the electronic gift is reflected on the electronic value. FIG. 21(*b*) shows an example that the balance of the electronic money is displayed by an image which is easy to be visually recognized, and an oblique portion indicates the added amount by the reflection of the electronic gift. In either case, when the step S2006 is performed, the contents of the electronic value when the electronic gift is reflected is displayed and the user can confirm how much benefit of the electronic gift can be obtained by the data communication with the information server 20 in real time.

Since the electronic money of the user is added according to the capacity of the data transmitted/received to/from the information server, when the communication fee of the terminal device is a data-capacity meter-rate system, it is possible to substantially reduce the user cost consumed for the data communication with the information server.

The service provider who operates the electronic value service (in this case, the electronic gift service provider who operates the electronic gift service and the electronic value service) can obtain the return for the amount reflected on the electronic money by the settlement process from the site manager of the information server. The use of the electronic money can increase by increasing the electronic money of which the user can dispose by the electronic gift service and a commission from the store using the electronic money can increase by increasing the use of the electronic money.

Meanwhile, it is possible to obtain the electronic money without a direct burden while the user does not perform a troublesome operation.

The site manager of the information server 20 uses the electronic gift service as a marketing tool and can expect that the access of the user, who wants to obtain the electronic gift, to the information server 20 increases and the number of users of the information server 20 increases.

By settling the call charge as the electronic value using the system when a general enterprise becomes the electronic gift service provider 30 and an employee uses (connects) a personal mobile terminal (terminal device) in business, it is possible to simplify the settlement process.

Although the electronic gift is reflected on the electronic money in the above description, the electronic gift may be reflected on the royalty point or mobile telephone prepaid money. For example, when a mobile telephone company becomes the electronic gift service provider and provides a service for reflecting the electronic gift on the mobile prepaid money, the communication amount due to the use of the mobile prepaid money can increase.

Although the secure communication means 11, the electronic gift rule management means 12, the data processing means 13, the value management means 14, the history management means 15 and the electronic gift management means 16 are realized by one electronic wallet card application 60 in the above description, the functions may be realized by a plurality of card applications. In this case, the card applications communicates with one another via a sharable interface or the terminal device 40 to perform the process of generating a series of electronic gifts and reflecting the electronic gifts on the electronic value.

Although the terminal device 40 includes the browser application 61 and the electronic wallet application 62 in the above description, they may be realized by the browser application having one electronic wallet function. In this case, the browser application having the electronic wallet function simultaneously displays the contents of the electronic value and the data received from the information server 20, as shown in FIG. 21(*a*) or 21(*b*).

Second Example

As the second example of the present invention, an information provision system for providing a royalty point based on the result of checking check data included in the electronic gift rule and data transmitted/received to/from an information server will be described.

Figure 22:
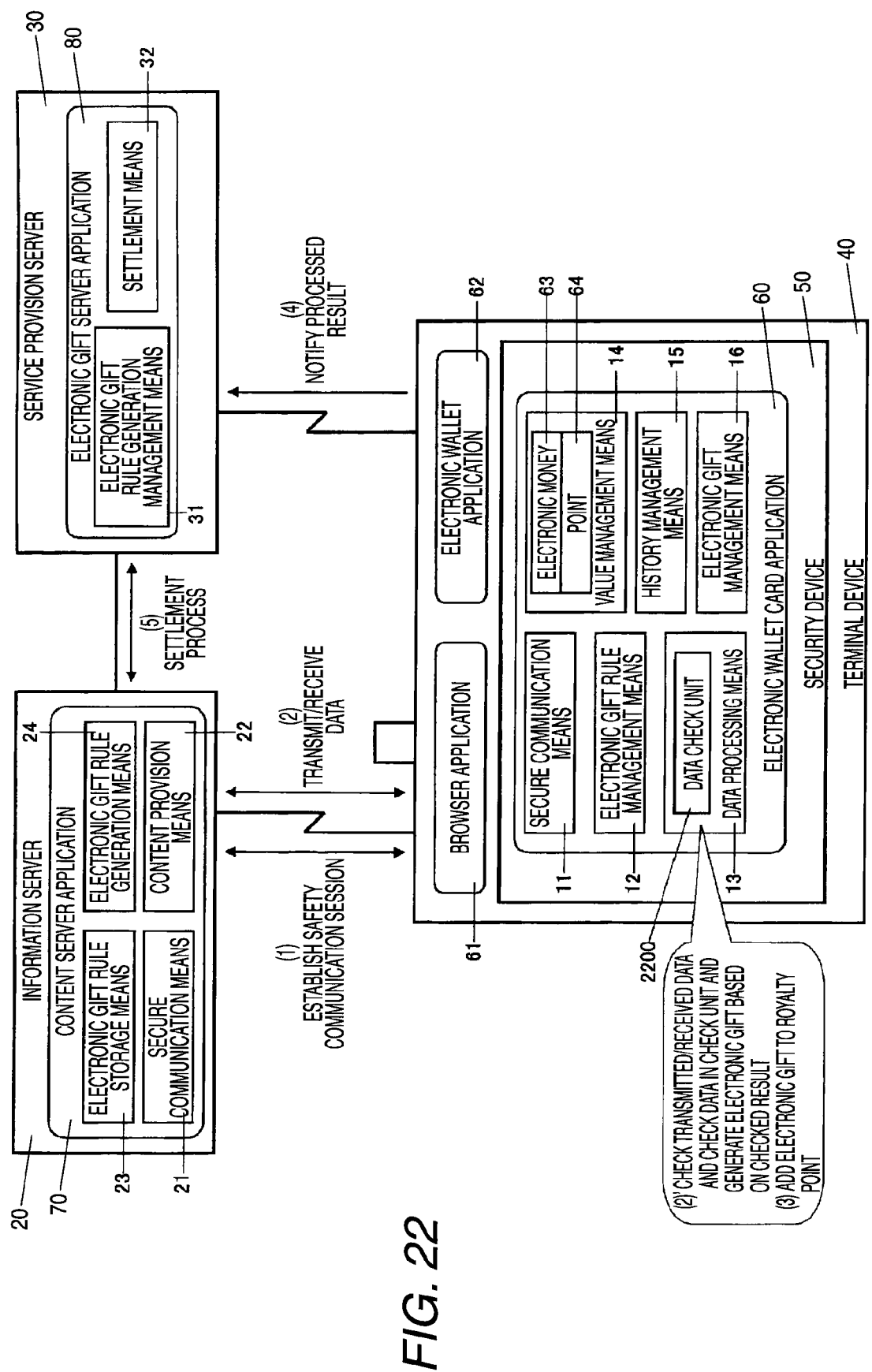
FIG. 22 is a view showing a block configuration and the operation sequence of the information provision system for providing a royalty point based on a check process result between check data included in the electronic gift rule and data transmitted/received to/from the information server, according to the second embodiment of the present invention.

As shown in FIG. 22, the basic configuration of the information provision system is identical to that of the information provision system shown in FIG. 16 according to the third embodiment.

Like the first embodiment, the information provision system according to the present embodiment includes a service provision server 30 of an electronic gift service provider who provides an electronic value service and an electronic gift service, an information server 20 of a site manager who affiliates with an electronic gift service business to provide information in the Internet, and a terminal device 40 such as a mobile telephone or a personal computer used by a user.

The information server 20 of the site manager includes a content server application 70 including secure communication means 21 which establishes a safety communication session and performs data communication with the terminal device 40, content provision means 22 for providing multi-media data such as HTML data or moving-image data with respect to a request from the terminal device 40, an electronic gift rule storage means 23 for storing an electronic gift rule transmitted to the terminal device 40, and an electronic gift rule generation means 24 for generating the electronic gift rule transmitted to the terminal device 40 as the software modules.

The service provision server 30 of the electronic gift service provider includes an electronic gift server application 80 including electronic gift rule generation management means 31 for generating, holding and managing the electronic gift rule for defining an electronic gift condition and settlement means 32 for performing a settlement process with the information server 20 of the site manager based on history information received from the terminal device 10 as the software modules.

The terminal device 40 includes a browser application 61 for holding the security device 50 and displaying information acquired via the Internet and an electronic wallet application 62 for displaying the contents of the electronic gift and the electronic value held in the security device 50 and realizing a user interface function of a payment process of the electronic values.

Figure 23:
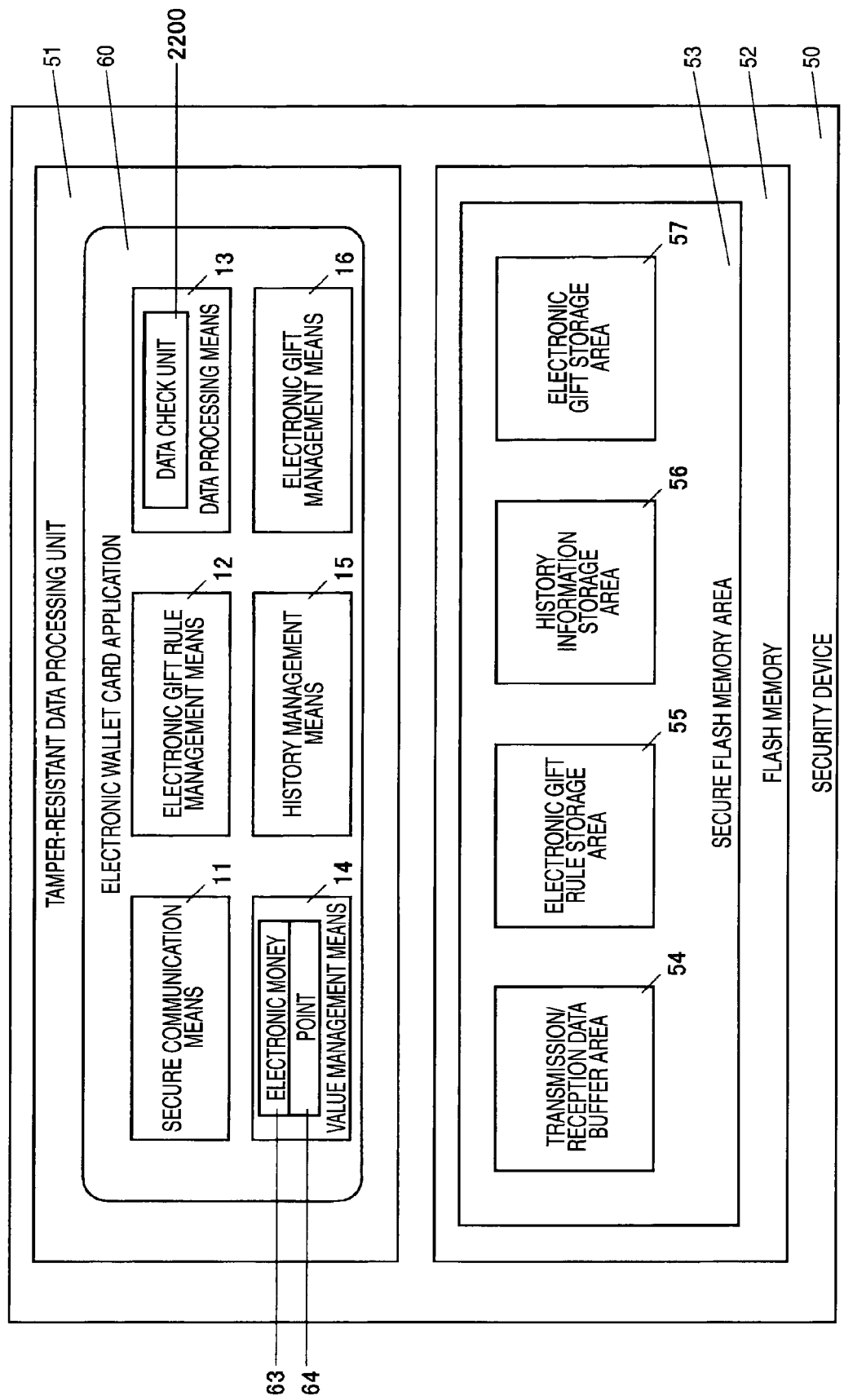
FIG. 23 is a view showing a block configuration of the security device according to the second embodiment of the present invention.

As shown in FIG. 23, the security device 50 includes an electronic wallet card application 60 for performing a process of managing the electronic value, generating the electronic gift, and reflecting the electronic gift on the electronic value, and the electronic wallet card application 60 includes the secure communication means 11, the electronic gift rule management means 12, the data processing means 13, the value management means 14, the history management means 15 and the electronic gift management means 16 as the software modules. Actually, the electronic wallet card application 60 is stored in a storage means such as a ROM or an EEPROM of the security device 50 and executed by the CPU of the security device 50.

The functions of the secure communication means 11, the electronic gift rule management means 12, the data processing means 13, the value management means 14, the history management means 15 and the electronic gift management means 16 are equal to those of the secure communication means 11, the electronic gift rule management means 12, the data processing means 13, the value management means 14, the history management means 15 and the electronic gift management means 16 according to the third embodiment shown in FIGS. 16 and 17. The data processing means 13 further includes a data check unit 220 for checking the check data included in the electronic gift rule and the data transmitted/received to/from the information server 20. In the value management means 14, electronic money 63 and a royalty point 64 are managed as the electronic value. In the value management means 14, the other kind of electronic value such as mobile telephone prepaid money which can be used in payment of the call charge of the mobile telephone may be managed.

Like the first embodiment, the electronic wallet card application 60 is issued by the electronic gift service provider for developing the electronic gift service business. The electronic gift service provider stores the electronic wallet card application 60 in the security device 50 and distributes the security device 50 to the user or provides the electronic wallet card application 60 on-line such that the user installs the electronic wallet card application 60 in his/her security device 50. In the electronic wallet card application 60, the public key of the CA server for verifying the validity of the electronic gift rule previously set by the electronic gift service provider and the electronic gift rule received from the information server 20 or the service provision server 30 is included.

The browser application 61 of the terminal device 40 affiliates with the electronic wallet card application 60 of the security device 50, receives and displays the data from the information server 20, and transmits input information. The electronic wallet application 62 of the terminal device 40 displays and operates the electronic value managed by the electronic wallet card application 60 of the security device 50.

The data configuration of the electronic gift rule is shown in FIG. 2(a) or 2(b) and described in an XML format. In the present embodiment, the amount of the electronic gift (point number added to the royalty point) generated when the check data is identical to information indicating that any data is check target (for example, the check target is data inserted between "<EGIFT#COMPARE#DATA>" n and "</EGIFT#COMPARE#DATA>") is defined in the electronic gift calculation method 203, the reflection of the electronic gift on the electronic value in the unit of 1 point is defined in the electronic gift reflection condition 204, and the royalty point 64 is defined as the electronic value, on which the electronic gift is reflected, in the electronic value identification information 205.

A plurality of electronic gift rules generated by the service provision server 30 or the information server 20 is stored in the electronic gift rule storage means 23 of the information server 20. In the case of the electronic gift rule generated by the service provision server 30, the electronic gift rule having the data configuration shown in FIG. 5(a) or 5(b) is stored and, in the case of the electronic gift rule generated by the information server 20, the electronic gift rule having the data configuration shown in FIG. 5(c) is stored. Even when the information server domain 203 or the target data URI is identical, the plurality of electronic gift rules having different combinations of the amount of the electronic gift (point number added to the royalty point) generated when the electronic value identification information 205 and the check data of the electronic gift calculation method 203 are identical are stored in the electronic gift rule means 23. The information server 20 selects the electronic gift rule based on the profile information of the terminal device 40 and transmits the electronic gift rule to the terminal device 40.

In the electronic value identification information 205 of the electronic gift rule, plural pieces of identification information may be specified. In this case, it is determined on which electronic value the electronic gift is reflected, by specification of the user in the terminal device 40.

The operation sequence of the information provision system according to the present embodiment is as follows.

(1) When a user has access to the information server 20 for providing the electronic gift using the browser application 61 of the terminal device 40, the terminal device 40 transmits an access request to the information server 20 and establishes a secure session between the secure communication means 11 of the security device 50 and the secure communication means 21 of the information server 20. At this time, the terminal device 40 transmits the profile information of the terminal device such as the kind information to the information server 20, the information server 20 selects an electronic gift rule from the plurality of electronic gift rules having different conditions stored in the electronic gift rule storage means 21 based on the access request and the received profile information and transmits the electronic gift rule of the security device 50 of the terminal device 40, and the security device 50 verifies and stores the received electronic gift rule in the electronic gift rule management means 12.

(2) Data is encrypted and transmitted/received under the safety communication session established between the terminal device 40 and the information server 20. At this time, in the terminal device 40, the secure communication means 11 of the secure device 50 decodes the received data and encrypts the transmitted data, and the decoded received data is displayed by the browser application 61.

(2)' At this time, the data processing means 13 of the security device 50 processes the data transmitted/received to/from the information server based on the electronic gift rule in the electronic gift rule management means and generates the electronic gift. The data processing means 13 generates the electronic gift when it is checked that the data transmitted/received to/from the information server and the check data are identical in the data check unit 2200 and stores the electronic gift in the electronic gift management means 16 (for example, the electronic gift of 1000 points is generated).

(3) The electronic gift management means of the security device 50 reflects the generated electronic gift on the electronic value indicated by the electronic value identification information 205 of the electronic gift rule, that is, the royalty point (for example, 1000 points are added to the royalty point 64 when the amount of the electronic gift is 1000 points and the electronic value is the royalty point) and the history management means 15 holds the history information of the process of reflecting the electronic gift on the electronic value. At this time, the electronic gift management means 16 does not perform the process of reflecting the electronic gift on the electronic value when the sum of the amounts of the electronic gifts held in the electronic gift management means 16 based on the electronic gift reflection condition 204 of the electronic gift rule is less than 1 point and performs the reflection process when the sum of the amounts of the electronic gifts is greater than or equal to 1 point.

(4) As the result of the process of reflecting the electronic gift on the electronic value, the terminal device 40 sends the history information held in the history management means 15 of the security device 50 to the settlement means 32 of the service provision server 30. In this case, the security device 50 and the settlement means 32 perform the mutual authentication and then the history management means 15 performs the electronic gift process and transmits the history information to the settlement means 32 of the service provision server 30 within a predetermined period. When the history information which is not transmitted to the settlement means 32 of the service provision server 30 within the predetermined period exists after the reflection process is performed, the value management means 14 stops the use of the electronic value, and, when the history information is transmitted to the settlement means 32 of the service provision server 30, the value management means 14 allows the use of the electronic value again.

The data processing means 13 stops the process of generating the electronic gift when the sum of the "amounts of the reflected electronic values" of the history information which is not transmitted to the service provision server 30 exceeds a predetermined amount (for example, the amount of money) even within the predetermined period and resumes the process of generating the electronic gift when the history information is transmitted to the settlement means 32 of the service provision server 30.

(5) The settlement means 32 of the service provision server 30 verifies the history information received from the terminal device 40, tabulates the history information in each information server, and performs the settlement process of the amount reflected on the electronic value with the information server 20. In this case, the site manager of the information server 20 pays the return for point reflected on the royalty point by the settlement process to the electronic gift service provider of the service provision server 30.

Figure 24:
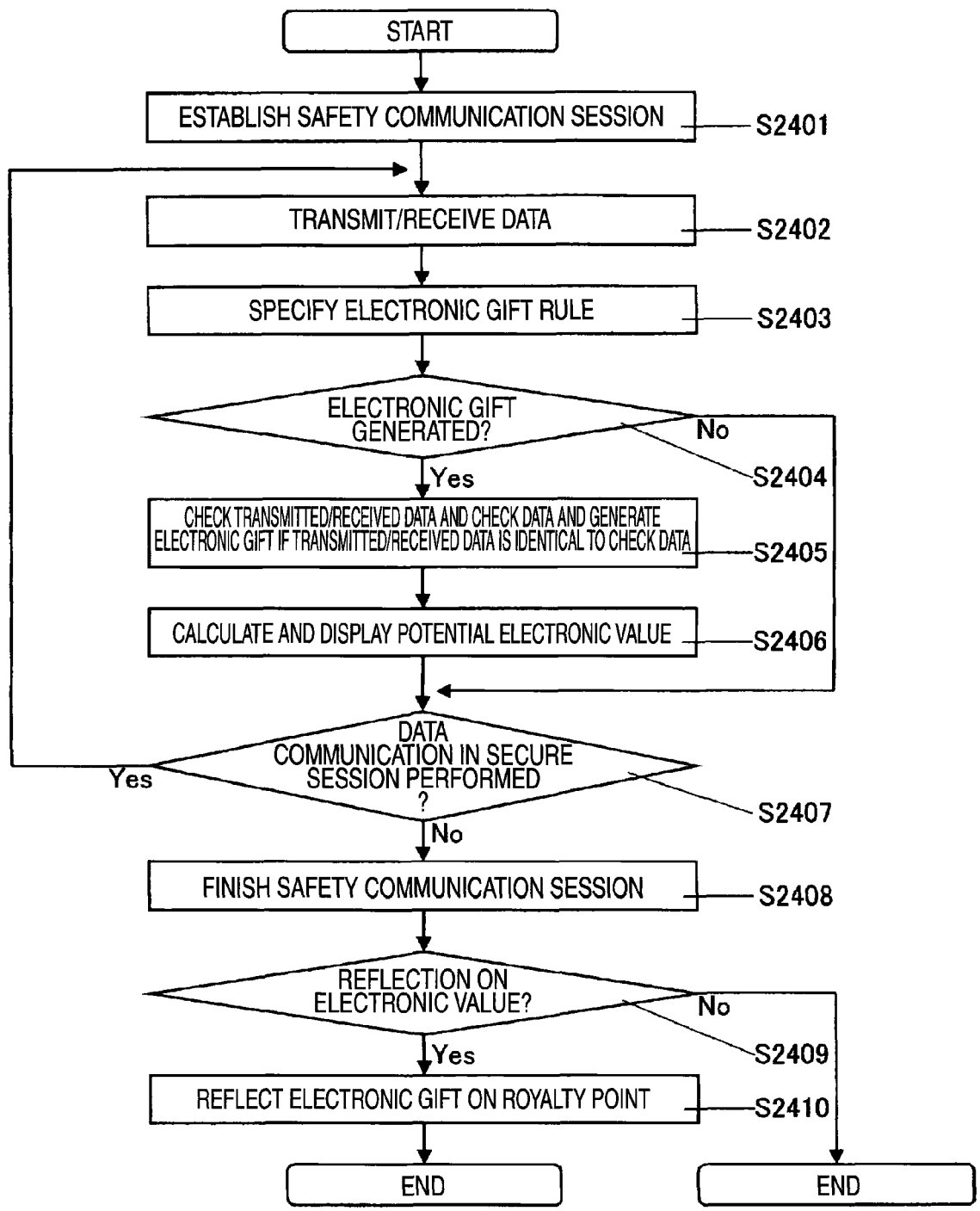
FIG. 24 is a flowchart showing a process of generating an electronic gift of the terminal device and reflecting the electronic gift on an electronic value, according to the second embodiment of the present invention.
Figure 26:
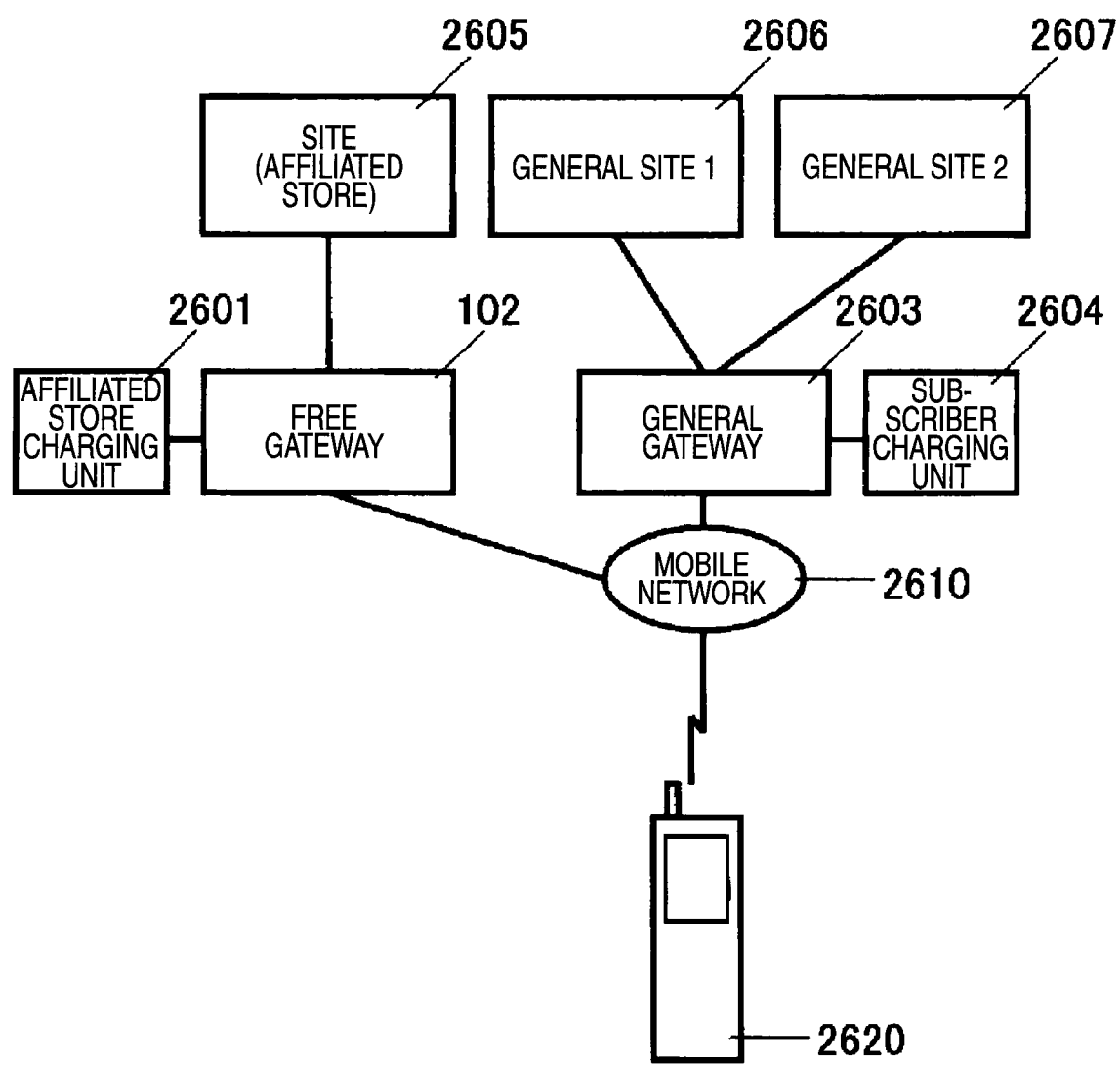
FIG. 26 is a view showing the configuration of a conventional system for imposing a packet communication fee of a mobile to an information providing site.
Figure 27:
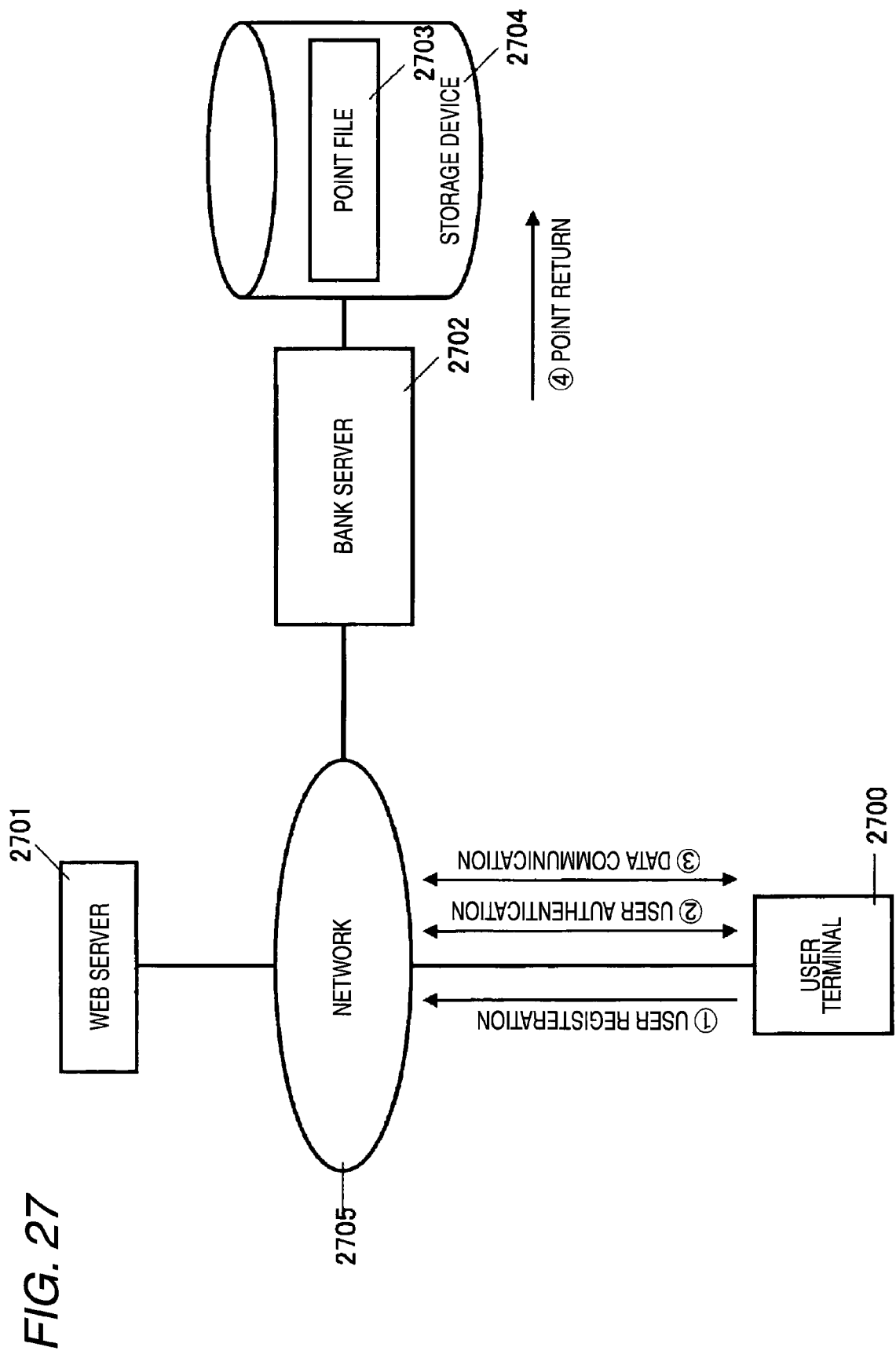
FIG. 27 is a view showing the configuration of a conventional system for giving a point in turn for contribution of a user to a web server.

In the operation sequence of the information provision system described above, the terminal device 40 according to the present embodiment performs the process of generating the electronic gift and reflecting the electronic gift on the electronic value according to a process shown in FIG. 24.

First, the terminal device 40 establishes the safety communication session with the information server 20 using the secure communication means 11 (S2401).

Next, the terminal device 40 transmits or receives data to or from the information server 20 (S2402). When the data is transmitted, an electronic gift rule is specified in the electronic gift rules held in the electronic gift rule management means 12 based on the URL of a transmission destination and, when the data is received, the electronic gift rule is specified based on the URL of a transmission source (S2403). At this time, the terminal device 40 specifies the electronic gift rule by checking the URL and the information server domain 202 of the electronic gift rule or the target data URI 212.

Next, the data processing means 13 of the terminal device 40 analyzes contents of the specified electronic gift rule, determines whether the electronic gift can be generated based on the history information held in the history management means 15 and the analyzed electronic gift rule (S2404). When it is determined that the electronic gift can be generated, the data received from the information server and the check data are checked using the data check unit 2200 based on the electronic gift calculation method 203 of the electronic gift rule and the history information held in the history management means 15 and the electronic gift is generated and stored in the electronic gift management means 16 (for example, the electronic gift of 1000 points is generated) when the data is identical. The terminal device 40 calculates and displays the contents of the potential electronic value when the electronic gift held in the electronic gift management means is reflected on the electronic value (S2406).

Next, the terminal device 40 determines whether the data communication is performed under the safety communication session (S2407). When the data communication is performed, the process progresses to the step S2402, which the data is transmitted or received, and, when the data communication is not performed, the safety communication session is finished (S2408). In the determination of the step S2404, when it is determined that the electronic gift is not generated, the terminal device 40 performs the step S2407 without performing the processes of the step S2405 and the step S2406.

After the safety communication session is finished (S2408), the terminal device 40 determines whether the electronic gift held in the electronic gift management means 16 can be reflected on the electronic value based on the electronic gift reflection condition 204 of the electronic gift rule and the history information held in the history management means 15 (S2409). When the sum of the amounts of the electronic gift held in the electronic gift management means 16 is less than 1 point, the process of reflecting the electronic gift on the electronic value is not performed, and, when the sum is greater than or equal to 1 point, the reflection process is performed. In the determination of the step S2409, when it is determined that the electronic gift can be reflected on the electronic value, the electronic gift management means 16 reflects the electronic gift on the electronic value indicated by the electronic value identification information 205 of the electronic gift rule, that is, the royalty point 64, and the history management means 15 holds the history information of the process of reflecting the electronic gift on the electronic value (S2410). In the determination of the step S2409, when it is determined that the electronic gift is not reflected on the electronic value, the terminal device 40 completes the process.

In the step S2403, when the electronic gift rule corresponding to the URL of the transmitted/received data does not exist in the electronic gift rules held in the electronic gift rule management means 12 and the electronic gift rule cannot be specified, the terminal device 40 performs the step S2407 without performing the step S2404, the step S2405 and the step S2406.

FIGS. 25(*a*) and 25(*b*) show an example of a screen displayed on the terminal device 40 in the step S2406. In this case, a browser display area 2502 and an electronic wallet display area 2501 are separated in the screen. The contents which are sent from the information server 20 to the browser application 61 are displayed in the browser display area 2502 and the contents of the electronic gift and the electronic value managed by the electronic wallet application 62 are displayed in the electronic wallet display area 2501. That is, the contents and the contents of the electronic value received from the information server 20 are simultaneously displayed and the user can confirm the contents of the electronic value while transmitting/receiving the data to/from the information server 20. For example, in the example shown in FIG. 25(*a*), "Point: 1051(+1000)" indicates that 1000 points are added and the royalty point becomes 1051 points when the electronic gift is reflected on the electronic value. FIG. 25(*b*) shows an example that the balance of the royalty point is displayed by an image which is easy to be visually recognized, and an oblique portion indicates the added point by the reflection of the electronic gift. In either case, when the step S2406 is performed, the contents of the electronic value when the electronic gift is reflected is displayed and the user can confirm how much benefit of the electronic gift can be obtained by the data communication with the information server 20 in real time.

When data identical to the check data is included in the data transmitted/received to/from the information server, the royalty point is added. Accordingly, since the check data included in the electronic gift rule functions as a lot and thus pleasure of the lot as well as the data communication with the information server is provided, the data communication with the information server of the user is prompted.

The service provider who operates the electronic value service (in this case, the electronic gift service provider who operates the electronic gift service and the electronic value service) can obtain the return for the point reflected on the royalty point by the settlement process from the site manager of the information server. The use of the royalty point can increase by increasing the royalty point of which the user can dispose by the electronic gift service and a commission from the store using the royalty point can increase by increasing the use of the royalty point.

Meanwhile, it is possible to obtain the royalty point without a direct burden while the user does not perform a troublesome operation.

The site manager of the information server 20 uses the electronic gift service as a marketing tool and can expect that the access of the user, who wants to obtain the electronic gift, to the information server 20 increases and the number of users of the information server 20 increases.

Although the electronic gift is reflected on the electronic money in the above description, the electronic gift may be reflected on the royalty point or mobile telephone prepaid money. For example, when a mobile telephone company becomes the electronic gift service provider and provides a service for reflecting the electronic gift on the mobile prepaid money, the communication amount due to the use of the mobile prepaid money can increase.

Although the terminal device 40 includes the browser application 61 and the electronic wallet application 62 in the above description, they may be realized by the browser application having one electronic wallet function. In this case, the browser application having the electronic wallet function simultaneously displays the contents of the electronic value and the data received from the information server 20, as shown in FIG. 25.

Although the present invention is described in detail with reference to specific embodiments, it is apparent that the present invention can be changed or modified without departing from the spirit and scope of the present invention.

The present application claims the benefit of Japanese Patent Application No. 2005-120682, filed on Apr. 19, 2005, the disclosure of which is incorporated herein in its entirety by reference.

INDUSTRIAL APPLICABILITY

A terminal device and a security device according to the present invention has an electronic payment function and can be widely used in a mobile device such as a mobile telephone, which is used instead of a wallet.

The invention claimed is:

1. A terminal device having a plurality of electronic values comprising:
   a secure communication unit which establishes a safety communication session and performs data communication with an information server;
   an electronic gift rule management unit which holds an electronic gift rule defining a condition of generating an electronic gift;
   a data processing unit which processes data transmitted to or received from the information server based on the electronic gift rule and generates the electronic gift;
   a value management unit which manages the plurality of electronic values of the terminal device,
   wherein the plurality of electronic values include an electronic money or a royalty point;
   wherein the electronic gift rule includes the URI (Uniform Resource Identifier) of the data to be processed based on the electronic gift rule and the information indicating an electronic value of the plurality of electronic values on which the electronic gift is to be reflected;
   wherein the URI included in the electronic gift rule indicates the URI of the information server and the electronic gift rule applies only to the data transmitted to or received from the information server under the safety communication session with the information server; and
   wherein the data processing unit reflects the generated electronic gift.

2. The terminal device according to claim 1, comprising a history management unit which holds history information of a process of reflecting the generated electronic gift on the amount of the electronic value of the terminal device,
   wherein the data processing unit processes the data transmitted to or received from the information server based on the electronic gift rule and the history information under the safety communication session and generates the electronic gift.

3. The terminal device according to claim 2, comprising an electronic gift management unit which temporarily holds the electronic gift generated by the data processing unit and timely reflects the electronic gift on the amount of the electronic value of the terminal device,
   wherein the electronic gift management unit reflects the temporarily held electronic gift on the amount of the electronic value of the terminal device based on the electronic gift rule and the history information held in the history management unit.

4. The terminal device according to claim 3, wherein the electronic gift management unit calculates and manages the amount of a potential electronic value of the terminal device when the electronic gift is reflected, in a state where the electronic gift management unit temporarily holds the electronic gift.

5. The terminal device according to claim 4, wherein information which defines a condition for applying the electronic gift according to the amount of the data transmitted to or received from the information server is included in the electronic gift rule, the terminal device establishes the safety communication session with the information server to transmit or receive the data, at this time, the data processing unit counts the amount of the data transmitted to or received from the information server based on the electronic gift rule to calculate the applied electronic gift, and the electronic gift management unit calculates the amount of the potential electronic value of the terminal device, displays the data transmitted to or received from the information server, and displays the amount of the potential electronic value of the terminal device.

6. The terminal device according to claim 4, wherein information which defines a condition for applying the electronic gift based on a result of checking check data included in the electronic gift rule and the data transmitted to or received from the information server is included in the electronic gift rule, at this time, the data processing unit checks the data transmitted to or received from the information server and the check data based on the electronic gift rule to calculate the applied electronic gift, and the electronic gift management unit calculates the amount of the potential electronic value of the terminal device, displays the data transmitted to or received from the information server, and displays the amount of the potential electronic value of the terminal device.

7. The terminal device according to claim 1, wherein information which defines a condition for applying the electronic gift according to the amount of the data transmitted to or received from the information server is included in the electronic gift rule, the terminal device establishes the safety communication session with the information server to transmit or receive the data, and, at this time, the data processing unit counts the amount of the data transmitted to or received from the information server based on the electronic gift rule to calculate the applied electronic gift and increase the amount of the electronic value of the terminal device managed by the electronic value management unit.

8. The terminal device according to claim 1, wherein information which defines a condition for applying the electronic gift based on a result of checking check data included in the electronic gift rule and the data transmitted to or received from the information server is included in the electronic gift rule, and, at this time, the data processing unit checks the data transmitted to or received from the information server and the check data based on the electronic gift rule to calculate the applied electronic gift and increase the amount of the electronic value of the terminal device managed by the electronic value management unit.

9. A security device mounted in a terminal device having a plurality of electronic values and communication function comprising:
a secure communication unit which establishes a safety communication session and performs data communication with an information server via the terminal device;
an electronic gift rule management unit which holds an electronic gift rule defining a condition of generating an electronic gift;
a data processing unit which processes data transmitted to or received from the information server based on the electronic gift rule under the safety communication session and generates the electronic gift; and
a value management unit which manages the plurality of electronic values of the terminal device,
wherein the plurality of electronic values include an electronic money or a royalty point;
wherein the electronic gift rule includes the URI (Uniform Resource Identifier) of the data to be processed based on the electronic gift rule and the information indicating an electronic value of the plurality of electronic values on which the electronic gift is to be reflected;
wherein the URI included in the electronic gift rule indicates the URI of the information server and the electronic gift rule applies only to the data transmitted to or received from the information server under the safety communication session with the information server;
wherein the data processing unit reflects the generated electronic gift.

10. The security device according to claim 9, comprising a history management unit which holds history information of a process of reflecting the generated electronic gift on the amount of the electronic value of the terminal device,
wherein the data processing unit processes the data transmitted to or received from the information server based on the electronic gift rule and the history information under the safety communication session and generates the electronic gift.

11. The security device according to claim 10, comprising an electronic gift management unit which temporarily holds the electronic gift generated by the data processing unit and timely reflects the electronic gift on the amount of the electronic value of the terminal device,
wherein the electronic gift management unit reflects the temporarily held electronic gift on the amount of the electronic value of the terminal device based on the electronic gift rule and the history information held in the history management unit.

12. The security device according to claim 11, wherein the electronic gift management unit calculates and manages the amount of a potential electronic value of the terminal device when the electronic gift is reflected, in a state where the electronic gift management unit temporarily holds the electronic gift.

13. An information providing method, wherein a terminal device having a plurality of electronic values comprises a secure communication unit which establishes a safety communication session and performs data communication with an information server; an electronic gift rule management unit which holds an electronic gift rule defining a condition of generating an electronic gift; a data processing unit which processes data transmitted to or received from the information server based on the electronic gift rule under the safety communication session and generates an electronic gift; and a value management unit which manages the plurality of electronic values of the terminal device,
wherein the plurality of electronic values includes an electronic money or a royalty point;
wherein the electronic gift rule includes the URI (Uniform Resource Identifier) of the data to be processed based on the electronic gift rule and the information indicating an electronic value of the plurality of electronic values on which the electronic gift is to be reflected;
wherein the URI included in the electronic gift rule indicates the URI of the information server and the electronic gift rule applies only to the data transmitted to or received from the information server under the safety communication session with the information server; and
wherein the terminal device establishes the safety communication session with the information server and to transmit or receive data, and, at this time, the data processing unit processes the data transmitted to or received from the information server based on the electronic gift rule and reflects the generated electronic gift.

14. An information server comprising:
an electronic gift rule generation unit which generates an electronic gift rule; and
a secure communication unit which establishes a safety communication session and performs data communication with a terminal device having a plurality of electronic values,
wherein, with respect to a data communication request from the terminal device, the secure communication unit establishes the safety communication session with the terminal device to transmit or receive data and, at this time, transmits the electronic gift rule generated by the electronic gift rule generation unit to the terminal device such that the terminal device reflects the generated electronic gift,
wherein the electronic gift rule includes the URI (Uniform Resource Identifier) of the data to be processed based on the electronic gift rule and the information indicating an electronic value of the plurality of electronic values on which the electronic gift is to be reflected,
wherein the URI included in the electronic gift rule indicates the URI of the information server and the electronic gift rule applies only to the data transmitted to or received from the information server under the safety communication session with the information server, and
wherein the plurality of electronic values include an electronic money or a royalty point.

* * * * *